(12) United States Patent
Shamir et al.

(10) Patent No.: US 11,562,499 B2
(45) Date of Patent: Jan. 24, 2023

(54) SYSTEM AND METHOD FOR IMAGE POSITION DETERMINATION USING ONE OR MORE ANCHORS

(71) Applicant: EVERYSIGHT LTD., Haifa (IL)

(72) Inventors: Hanan Shamir, Haifa (IL); Asaf Ashkenazi, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 134 days.

(21) Appl. No.: 16/763,987

(22) PCT Filed: Nov. 13, 2018

(86) PCT No.: PCT/IL2018/051221
§ 371 (c)(1),
(2) Date: May 14, 2020

(87) PCT Pub. No.: WO2019/097507
PCT Pub. Date: May 23, 2019

(65) Prior Publication Data
US 2020/0279392 A1  Sep. 3, 2020

(30) Foreign Application Priority Data

Nov. 14, 2017  (IL) .......................................... 255671

(51) Int. Cl.
*G06T 7/70* (2017.01)
*G06F 3/01* (2006.01)
(52) U.S. Cl.
CPC ................ *G06T 7/70* (2017.01); *G06F 3/011* (2013.01); *G06T 2207/30244* (2013.01)
(58) Field of Classification Search
CPC .. G06T 7/70; G06T 2207/30244; G06F 3/011
See application file for complete search history.

(56) References Cited

U.S. PATENT DOCUMENTS 7,401,920 B1   7/2008 Kranz et al.
2012/0249416 A1  10/2012 Maciocci et al.
(Continued)

FOREIGN PATENT DOCUMENTS

WO  WO 2016/135727       9/2016
WO  WO-2017/076929 A1    5/2017
WO  WO 2017/179054      10/2017

OTHER PUBLICATIONS

International Search Report for PCT Application No. PCT/IL2018/051221, dated Mar. 13, 2019.
(Continued)

*Primary Examiner* — Myron Wyche
(74) *Attorney, Agent, or Firm* — Pearl Cohen Zedek Latzer Baratz LLP

(57) ABSTRACT

A system and a method of position and orientation determination use an image capturing device and position and orientation sensors in user equipment such as a head mounted device "HMD". The method may comprise receiving position measurements from the position sensor and receiving a selection of one or more anchors based on said position measurements including the position of each anchor. The position and orientation measurements may be used to determine whether any selected anchor is visible to said image capturing device based on said position and orientation measurements. Then the image capturing device may be activated to capture an image including said one or more anchors when a selected anchor is visible. The image may be analyzed to determine the position and orientation of the image capturing device relative to the one or more anchors.

20 Claims, 31 Drawing Sheets

(56) References Cited

U.S. PATENT DOCUMENTS

| | | |
|---|---|---|
| 2012/0300020 A1 | 11/2012 | Arth |
| 2015/0204673 A1 | 7/2015 | Abramson Liani et al. |
| 2017/0053042 A1 | 2/2017 | Sugden et al. |
| 2017/0201709 A1* | 7/2017 | Igarashi .................. G06F 3/048 |
| 2017/0228878 A1 | 8/2017 | Goldman |

OTHER PUBLICATIONS

Clements Arth et al. "Wide area localization on mobile phones", Mixed and Augmented Reality, 2009. ISMAR 2009. 8th IEEE International Symposium on IEEE, Piscataway, NJ, USA, Oct. 19, 2009, pp. 73-82.
Extended Search Report for EP Patent Application No. 18877403.8, dated Nov. 5, 2021.

* cited by examiner

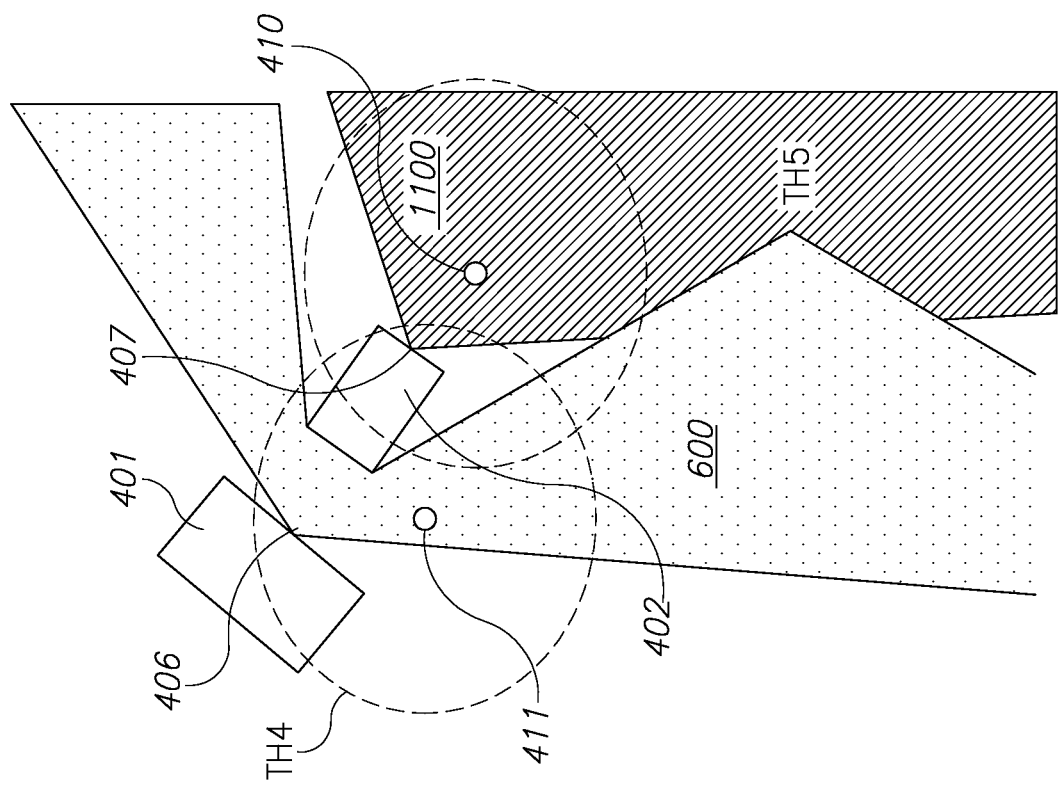
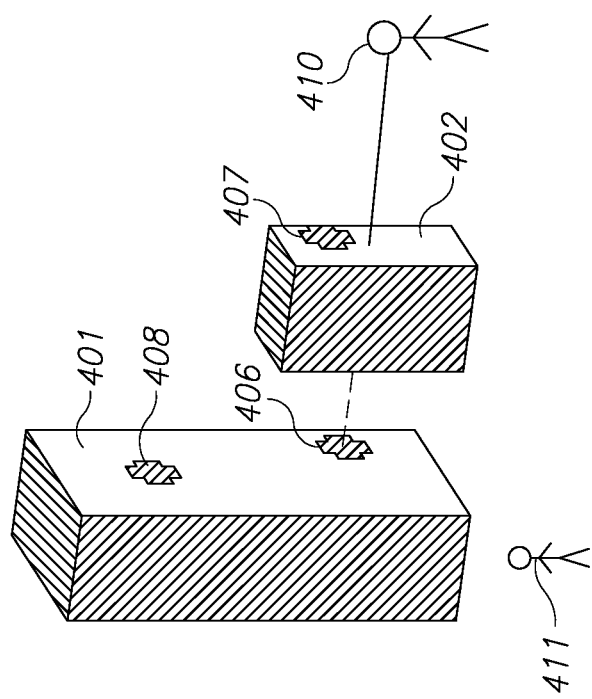
Figure 11B
Figure 11A

SYSTEM AND METHOD FOR IMAGE POSITION DETERMINATION USING ONE OR MORE ANCHORS

CROSS-REFERENCE TO RELATED APPLICATIONS

This application is a National Phase Application of PCT International Application No. PCT/IL2018/051221, International Filing Date Nov. 13, 2018, entitled: "SYSTEM AND METHOD FOR IMAGE POSITION DETERMINATION USING ONE OR MORE ANCHORS", Published on May 23, 2019 under PCT International Application Publication No. WO 2019/097507 which claims the priority of Israel Patent Application No. 255671, filed Nov. 14, 2017, which is hereby incorporated by reference in its entirety.

FIELD OF THE INVENTION

The present invention relates generally to the field of position and orientation determination using an image capturing device, in which the location of the image capturing device is determined by reference to one or more anchors.

BACKGROUND OF THE INVENTION

An image including a well-known landmark or other feature whose location is known may be used to infer information as to the location of the image capturing device that was used to capture the image. In the art, such a landmark or feature is termed an "anchor".

SUMMARY OF THE INVENTION

Some embodiments of the invention generally relate to determining position and location by reference to one or more anchors in the field of view "FOV" of an image capturing device.

Some embodiments of the invention provide a method of position and orientation determination using an image capturing device comprised in user equipment comprising at least one position sensor and at least one orientation sensor. The method may for example be implemented in one or more processors in a head mounted device or "HMD". The method may comprise receiving position measurements from said position sensor, and receiving a selection of one or more anchors based on said position measurements. The selection may include the position of each anchor. The method may further comprise receiving orientation measurements from said orientation sensor, determining whether any of said one or more anchors is visible to said image capturing device based on said position and orientation measurements, and activating said image capturing device to capture an image including said one or more anchors when any of said one or more anchors is visible to said image capturing device. The image may then be analyzed to determine the position of the image capturing device relative to the one or more anchors, and optionally the orientation.

The determination as to whether an anchor is visible may be based on received data relating to the visibility of the anchor. Such data may be stored in a database for example and some embodiments of the invention comprise such a database. The received data may comprise an area or volume associated with each anchor from which an image capturing device may have an uninterrupted line of sight "LOS" to the anchor. The data may be time dependent and the determination may then be based on the current time.

Data relating to an anchor may determine a relationship between time and an area or volume from which an image capturing device may have an uninterrupted LOS to the anchor. Then the determination as to whether an anchor is visible may comprise determining the current time to determine a current area or volume from which an image capturing device may have an uninterrupted LOS to the anchor and using the current area or volume to determine whether any of the one or more anchors is visible at the current time. The time dependency may be based on behavior of people at different times of day in a geographical region including an anchor.

Data relating to an anchor, for example provided from a database, may be dependent on ambient conditions, and the determination as to whether an anchor is visible may be based on the ambient conditions.

Some embodiments of the invention comprise a future position or both from measurements of current position. Then the selection of one or more anchors may be based on a predicted position.

The visibility determination may be based on one or more parameters of the image capturing device such as but not limited to range, field of view and resolution. The visibility determination may be based on one or more characteristics relating to the user such as but not limited to height, age, interests etc.

According to some embodiments of the invention an anchor may comprise a source of radiation. The radiation source may be modulated in a predetermined manner so that an image of the anchor contains additional information as to the orientation of the image capturing device as compared to an image of an unmodulated source. Thus a method according to some embodiments of the invention may comprise receiving for each source of radiation one or more features comprising any one or more of emission spectrum, intensity, modulation, location, illumination angle; and the image analysis and/or position and orientation determination may be based on any of these features.

According to some embodiments of the invention an anchor may include a source of acoustic signals. Time of flight information relating to the receipt of such signals may be used to determine information about the position of a user.

According to some embodiments of the invention historical information may be compiled relating to the effectiveness of an anchor, for example when viewed from various positions or based on other parameters as discussed herein. The selection of an anchor may then be based on this historical information. According to some embodiments of the invention a notification of an area in which no anchor is visible may be received and then no determination as to whether an anchor is visible is made in that area.

According to some embodiments of the invention, a database including a measure of the effectiveness of the anchor in determining a relative position and orientation of the image capturing device to the one or more selected anchors, may be updated based on image analysis.

Some embodiments of the invention provide a method comprising receiving measurements of position and orientation from said position and orientation sensors; capturing one or more images including a set of anchors using said image capturing device; selecting one or more anchors of said set of anchors based on said position measurements from a database relating to a plurality of anchors including said set of anchors, wherein said database includes the position and visibility of each anchor and the selection is based on the visibility; analyzing the image to determine the relative position and orientation of the user equipment to one or more selected anchors; and using the relative position and orientation to refine said received measurements of position and orientation.

Some embodiments of the invention provide a head mounted device "HMD" comprising an image capturing device, at least one position sensor, at least one orientation sensor and a controller, wherein the controller is configured to receive position measurements from said at least one position sensor; receive a selection of one or more anchors based on said position measurements including the position of each anchor; receive orientation measurements from said at least one orientation sensor; determine whether any of said one or more anchors is visible to said image capturing device based on said position and orientation measurements; activate said image capturing device to capture an image including said one or more anchors when any of said one or more anchors is visible to said image capturing device; and analyze the image to determine the position and orientation of the image capturing device relative to the one or more anchors.

A system according to some embodiments of the invention may comprise a head mounted device "HMD". A system according to some embodiments of the invention may comprise a server.

Some embodiments of the invention provide a transitory or non-transitory computer readable medium which when implemented in a processor in a server or a HMD cause the processor to perform any of the methods described herein.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIGS. 5A and 5B are perspective and plan views showing two anchors in which FIG. 5B shows a visibility clearance area for an anchor according to some embodiments of the invention;

FIGS. 11A and 11B are perspective and plan views illustrating the use of different anchors for different users, according to some embodiments of the invention;

DETAILED DESCRIPTION OF THE INVENTION

Figure 1:
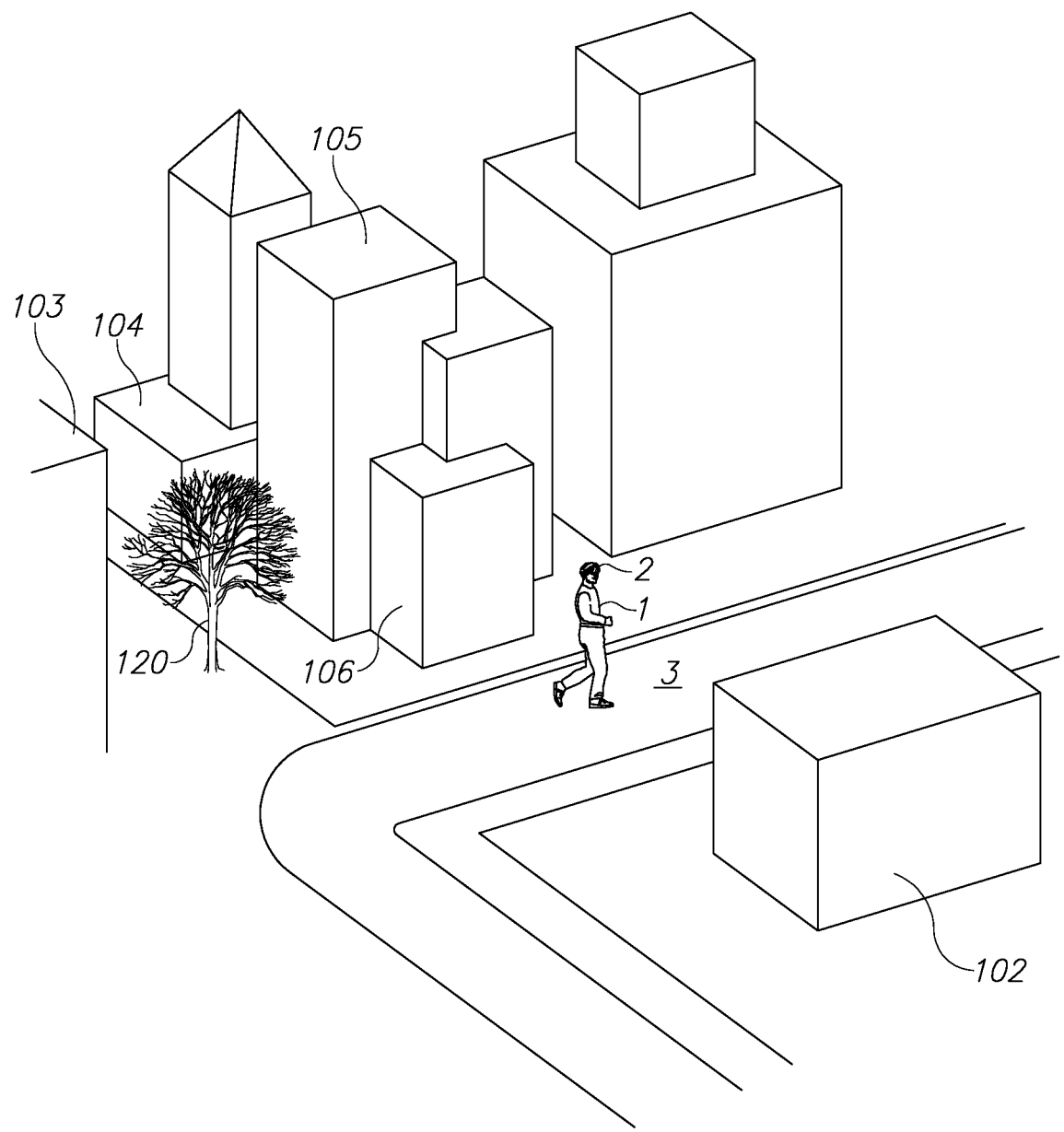
FIG. 1 shows a city scene including several anchors for selection according to some embodiments of the invention.

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Some embodiments of the invention provide systems and methods for determining position and orientation by reference to one or more anchors in the FOV of an image capturing device. The image capturing device may be part of user equipment such as a head mounted device "HMD". Where a HMD is mentioned herein it may unless otherwise stated be replaced by any user equipment that may be carried by a user. In the following "position" and "location" are used interchangeably and are intended to have the same meaning. "Anchors" may take various forms such as but not limited to landmarks that may be in a FOV of an image capturing device such as buildings, or geographical features, or temporary structures, or parts of any of the foregoing such as a window or prominent corner of a building or an outcrop of a mountain. The location of such anchors may be known and the known location may be used to determine the location of the image capturing device, for example in terms of position and orientation, and to infer the location of the user. The location of the user and/or image capturing device may be approximately known, for example from GPS or other measurements, and the location relative to an anchor may be used to refine the approximate location Similarly, according to some embodiments of the invention a measure of the orientation of the user may be refined after determining orientation relative to an anchor in the FOV of an image capturing device.

A precise measurement of position and/or orientation is particularly useful in a variety of applications including augmented reality "AR". For example, with a precise measurement of position and orientation it is possible to present graphical information to a user which is aligned with one or more anchors, or parts of anchors, in the FOV of the user. This might be by means of a headset, otherwise known as a head mounted device or "HMD" worn by the user including a display. One possibility is for an advertisement to be presented to a user that is precisely aligned with a feature in the FOV such as the side of a building or a window. A feature with which graphical information is aligned may itself be an anchor. Alternatively a feature with which graphical information is aligned may be some feature in the FOV of a user which is not an anchor or has not been used as an anchor for position and/or orientation determination. The possibility to present such information to individuals rather than by broadcasting, for example by projecting imagery onto buildings as is known in the art, may facilitate targeting information to users or tailoring information presented to users according to their preferences.

An anchor according to some embodiments of the invention may be represented as a computer-generated object which may include a combination of variables describing the anchor. For example, the object may contain information sufficient for a 3D rendering or visualization of the anchor. It may contain information enabling a two-dimensional image of the anchor taken by an image capturing device to be compared to the object from which the position and orientation of the image capturing device may be determined. Image correlation methods are well known in the art, where two or more images are registered one against the other for example by means of pixel array gray level cross-correlation. Once the two or more images contain similar image content (or at least a portion of the two or more images includes some similarity in content), a correlation function may extract the relative position and orientation of the two images, by means of pixel offset, and angle of rotation. The correlation function may be implemented in several ways. One way is known in the art as the discrete cross correlation. Another method known in the art for image correlation uses a Fast Fourier transform to get a direct computation of the correlation. It may be appreciated by a person skilled in the art, that multiply operation of two entities in the Fourier space, corresponds to correlation in the physical space. One may consider two images a, b. After transformation to the Fourier space: $A=F\{a\}$; $B=F\{b\}$. Multiplying the two entities gives $C=A \cdot B^*$ ; $c=F^{-1}\{C\}$; $(\Delta x, \Delta y)=\operatorname{argmax}\{c\}$.

An anchor may be derived from a 3D model of an area including the anchor. For example there are a number of sources of digital terrain elevation maps covering various geographical areas from which objects representing selected anchors may be generated. An anchor may be a subset of a digital terrain map or other 3D model of a larger area or volume. An anchor may contain information in addition to the data set from which it was extracted such as descriptors which may be useful in comparing an image of an anchor to a reference image as described further herein.

Some embodiments of the invention relate to the selection of one or more anchors for use in the determination of position and/or orientation where more than one anchor is in the vicinity of the image capturing device. This selection may be useful in power saving, for example by activating an image capturing device when a selected anchor is likely to be in the field of view of the camera. The selection of one or more features from a larger set of anchors for use in determining position and/or orientation may save on image processing power and/or time. Time saving may reduce latency in position determination.

The term "orientation" is used herein unless otherwise stated to refer to the direction in which a user is oriented, e.g. north, south, east or west. Some embodiments of the invention additionally take account of the line of sight "LOS" of a user, which in addition to defining orientation also defines tilt, or the elevation at which a user's gaze or an image capturing device is directed.

FIG. 1 shows a possible scenario in which more than one anchor is in the vicinity of an image capturing device. In FIG. 1 a user 1 wearing a head mounted device (HMD) 2 is walking along a city street 3. The head mounted display which is described in more detail with reference to FIG. 2 comprises in this example an image capturing device. The image capturing device may have a wide FOV, for example it may be a 360° FOV camera.

Alternatively, it may have a narrow FOV. Along the street and in the general area through which the user is walking there are several anchors, in this example buildings 101-106 with different shapes, in the vicinity of the camera and whose location may be known. However not all of these are visible to the user 1. In the position shown in FIG. 1, depending on his orientation, the user can see buildings 101, and 102, possibly 103 and the top of building 105. However, the user cannot see building 104 because it is blocked by building 105 and other buildings between the user 1 and building 104.

According to some embodiments of the invention, one or more anchors such as buildings 101-106 may be selected depending on whether they are likely to be visible to the user or an image capturing device carried by the user. The selection may be based on some pre-filter of all anchors in a dataset, for example buildings 101-106 may be within a predetermined radius of the position of user 1, as described further herein. "Visible" is intended to mean that the user or device has a direct or uninterrupted line of sight "LOS" to the anchor and may be defined by reference to the position from which the anchor is viewed. For example, the visibility of an anchor may be defined by an area on the ground containing positions from which an imaging device may have a direct or uninterrupted LOS to the anchor, as shown for example in FIG. 5B. The area may be the envelope of possible viewing positions. It may be restricted by some criterion. For example, it may be restricted to a radius from the anchor to exclude distant viewing positions even where a LOS is possible.

The location of the user may be known for example from determination using mobile technology such as the global positioning system (GPS). The known location of some or all of the anchors may be more precise than the known location of the user. According to some embodiments of the invention, measurements of position and orientation or both, received for example from one or more sensors carried by user 1, may be refined using a measurement of position or orientation or both relative to one or more anchors.

The selection of one or more anchors may be carried out by consulting a database of anchors and their locations, and the database may additionally store data relating to the visibility of an anchor relative to viewing location. The selection may be restricted, for example a database of data relating to a large number of anchors may be pre-filtered before a selection is made. The restriction may be according to one or more criteria, for example to anchors within a predetermined radius of the user 1. In other words, the anchors in the database may be pre-filtered and from those a selection may be made of one or more anchors which are visible from the location of the user 1.

Figure 20:
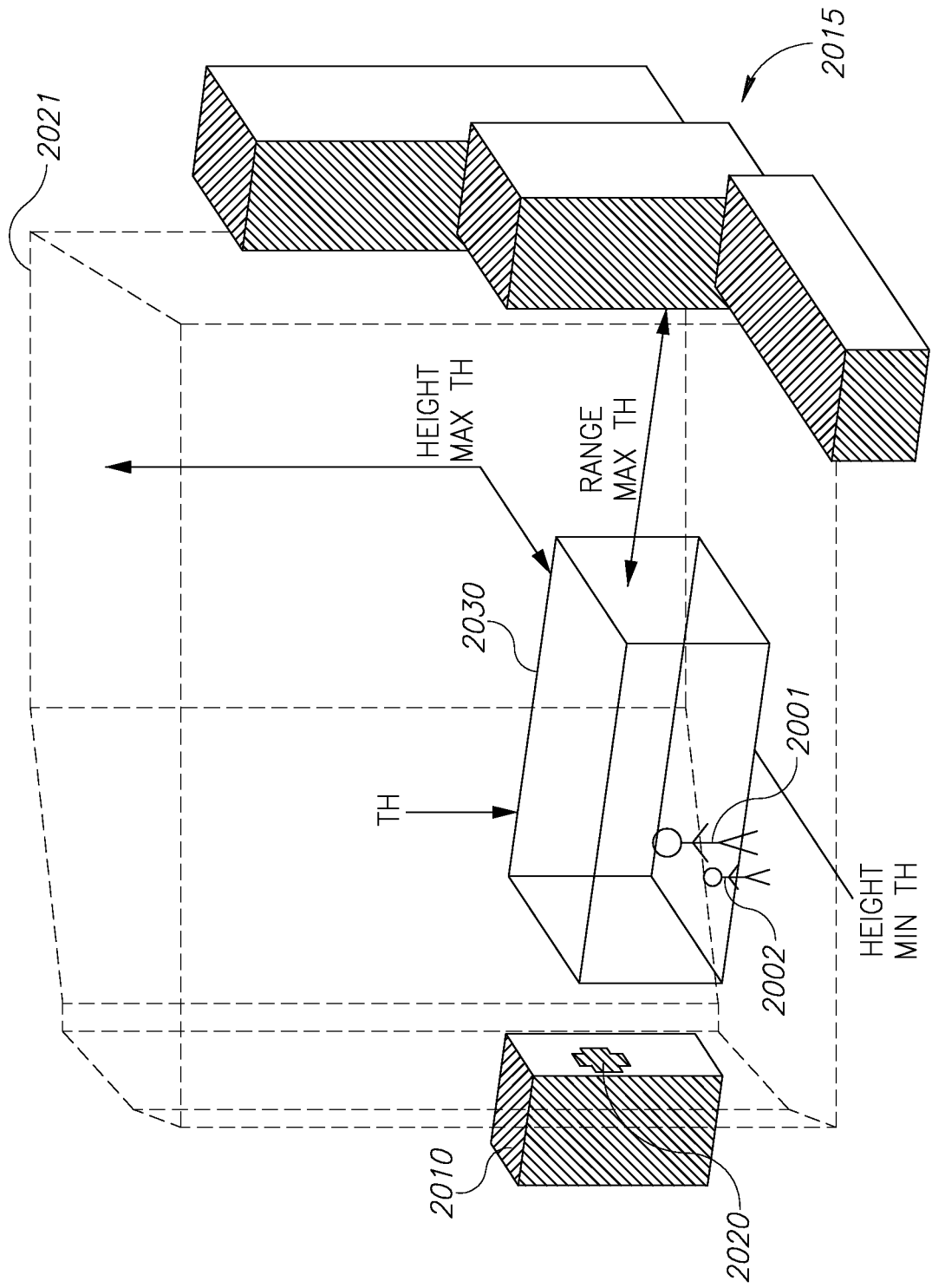
FIG. 20 is a perspective view showing the mapping of anchors to volumes according to some embodiments of the invention.

The visibility of an anchor may also be defined by a volume representing an envelope of possible viewing positions as shown for example in FIG. 20, to allow for the possibility that anchors may be viewed from different elevations. This may be useful in the scenario shown in FIG. 1 including multi-storey buildings where anchors may be viewed from various storeys.

This may also be useful for selecting an anchor appropriate to the height of a user. For example, if user 1 was on the opposite side of the street the visibility of building 105 might depend on the user's height. Thus, according to some embodiments of the invention the selection of one or more anchors may be based on one or more user characteristics, such as the height of the user.

In practice the visibility of an anchor may be time dependent. The time dependency may range over a long or short period of time. For example, the visibility of building 104 may be less in summer, when a deciduous tree 120 between the building 104 and user 1 is in full leaf, than in winter.

The visibility of an anchor such as building 106 may vary according to time of day. For example, it may have a highly reflective surface such that an image of building captured in full sun is inferior to an image captured when it is in shade. It will be appreciated from this example that a criterion that may be used for selection of an anchor may be dependent on one or more ambient conditions such as prevailing light levels or climatic conditions, e.g. weather.

Additional variables that may affect the visibility of an anchor may be taken into account in various ways. According to some embodiments of the invention, a set of candidate anchors may be identified based on whether they are visible according to their physical characteristics such as size, shape absolute position and relative position, e.g. whether one blocks another. A viewing area or volume may be used for this purpose. Then a subset of the candidate anchors may be selected according to additional, e.g. external criteria. According to other embodiments of the invention these operations may be performed in reverse. For example, an initial viewing area or volume may be generated based on physical characteristics of the anchors and this may be reduced to a smaller volume or area based on one or more external criteria such as time of day or prevailing weather.

Thus some embodiments of the invention may include modifying a viewing area or volume and then selecting one or more anchors within the modified volume.

According to some embodiments of the invention, a LOS map may be generated indicating the visibility of anchors according to whether an uninterrupted LOS is available. The map may be 3-dimensional. The map may be modified according to various criteria including any one or more of the criteria discussed herein.

A criterion that may be used for selection of an anchor may be subjective, e.g. dependent on one or more characteristics of the user. For example, one kind of user may be more likely to look at a particular anchor, whereby it may be in the FOV of the image capturing device, than another. This likelihood may depend on a variety of user characteristics including physical characteristics such as height and age and behavioral characteristics such as interests, e.g. in architecture.

The selection of an anchor may be based on a predicted rather than actual position of the image capturing device of user 1. For example, measurements of position determined by a sensor worn by the user may be used to determine a future position of the user. Then, for example, the selection of anchors may depend on whether the user is running, walking or stationary.

In the case of an image capturing device with less than 360° FOV, an anchor may qualify as visible from a particular position but it may only be in the FOV of the image capturing device at certain orientations. Thus, according to some embodiments of the invention, an image capturing device may be activated to capture an image including one or more selected anchors when the position and orientation measurements indicate that the one or more selected anchors are visible to the image capturing device. This may be useful to save on use of power by not capturing images that are not required.

Operations and methods described herein may be performed either in a HMD, for example a controller forming part of a HMD electronic control unit, or a remote server in communication with a HMD, unless otherwise stated.

Some embodiments of the invention may be used to provide an augmented reality "AR" experience to a user. For example, a user may wear a headset which in one mode of operation permits a normal view of a scene as would be visible without the headset and which in another mode of operation displays to a user additional information, for example overlaid on the normal view. The headset may be in the form of goggles or glasses. The information displayed to a user may be in any form and may come from one or more of a variety of sources. For example, some embodiments of the invention may be used to display short message service "SMS" or other forms of text message to a user, which may be received or retrieved from an SMS server. Some embodiments of the invention may be used to display advertisements to one or more users. Some embodiments of the invention may be used to display emergency information to one or more users, such as information relating to the evacuation of an area.

It should be noted here that when information is presented to a user by display on a headset the user may be required to look in a particular direction in order to see the information. For example, in some AR systems, just as a user may have to look in a certain direction to get a real view of a building, the user may have to look in the same direction to see AR information overlaid on the building. The fact that the user is presented with virtual or synthetic information in addition to a real world view does not guarantee that the user looks at it. Therefore, it is useful to determine whether a user presented with AR information looked in the correct direction to see it.

Figure 2A:
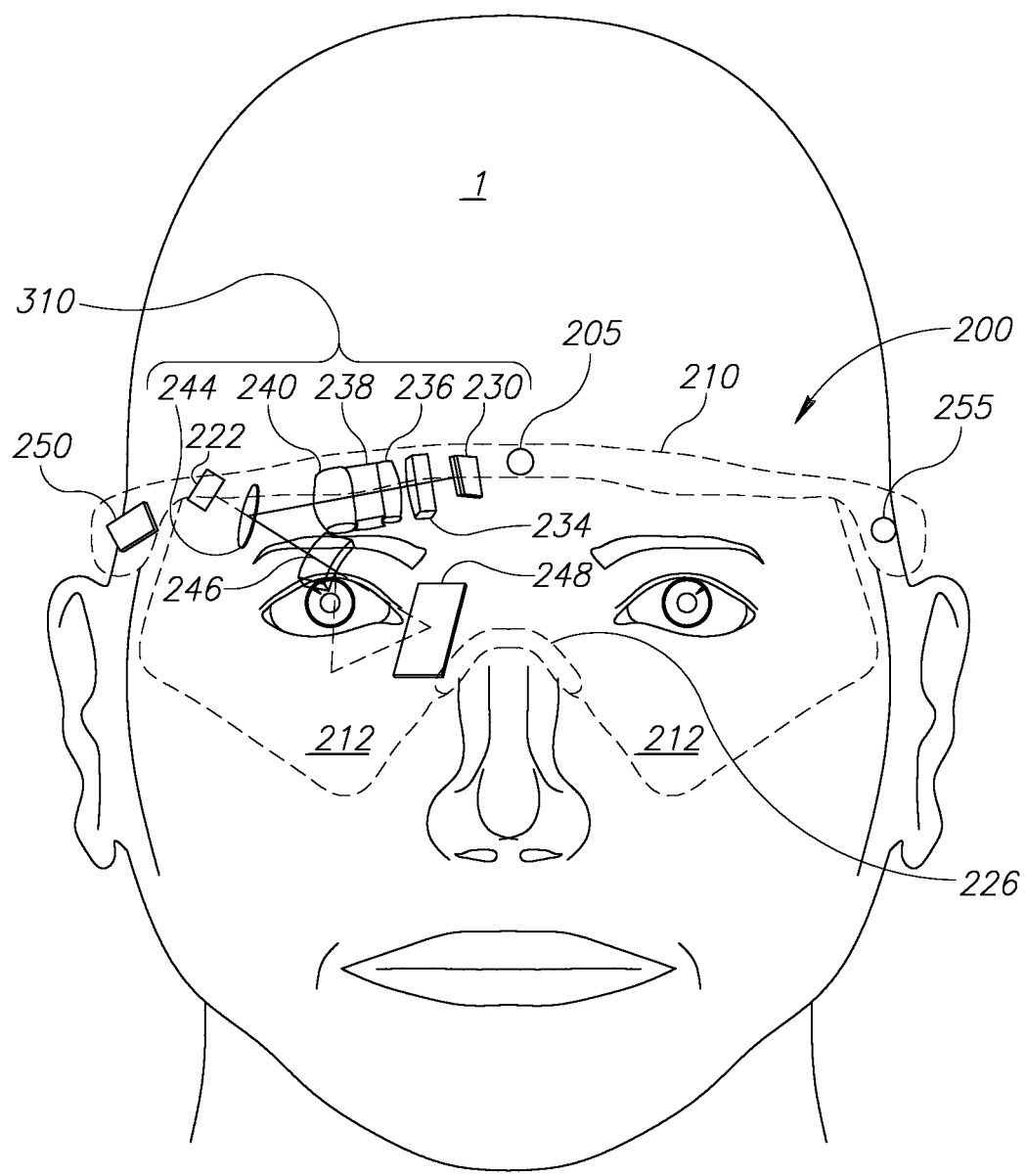
FIGS. 2A, 2B and 2C are respectively a front view of a HMD according to some embodiments of the invention mounted on the head of a user, a detailed view of an optical display system of the HMD of FIG. 2A, and a side view corresponding to FIG. 2A.
Figure 2B:
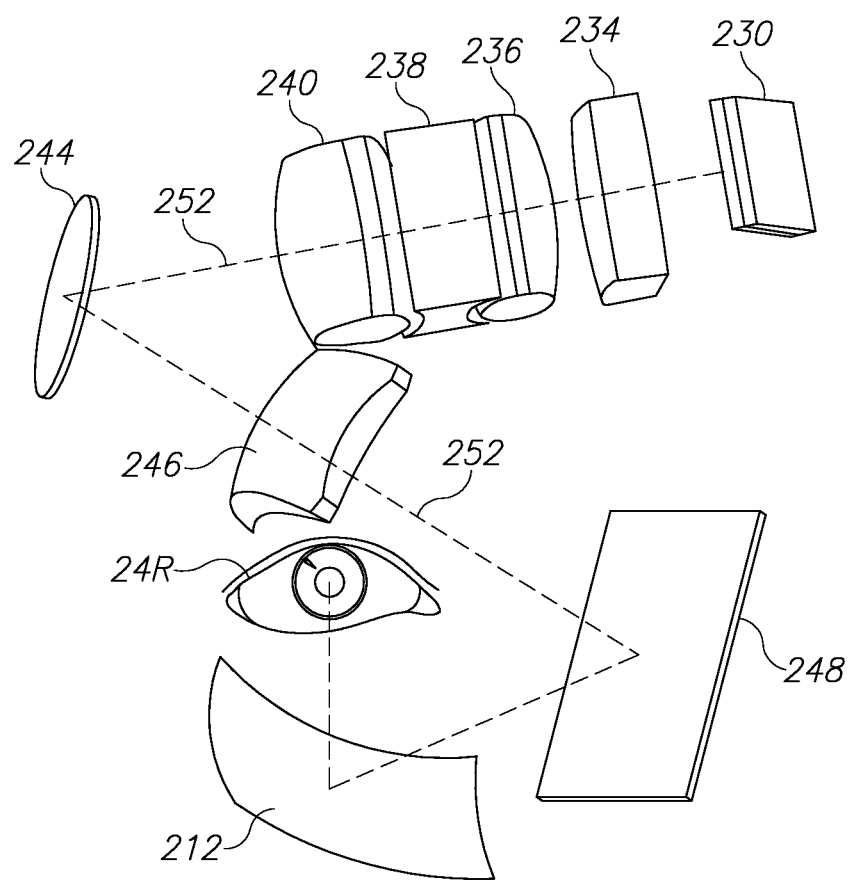
Figure 2C:
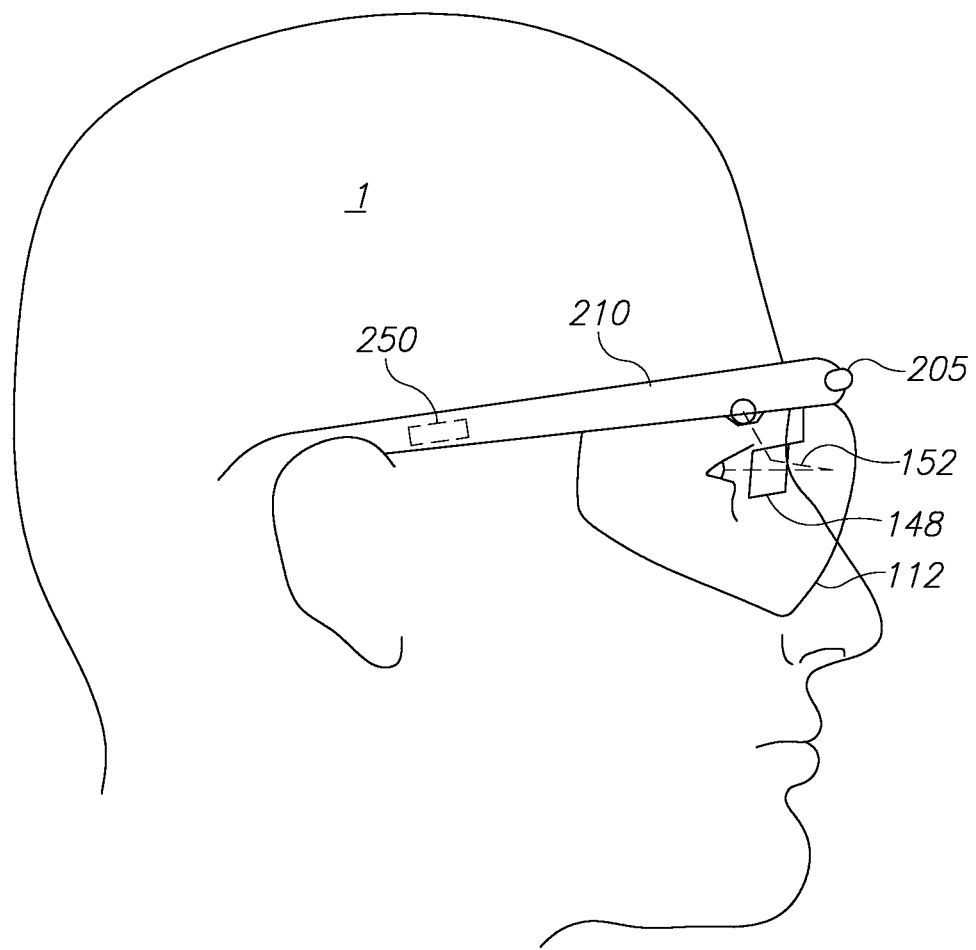

Reference is now further made to FIGS. 2A, 2B and 2C which illustrate a HMD 200 according to some embodiments of the invention. Brief details are provided herein for the purpose of explanation. A HMD suitable for use in some embodiments of the invention is disclosed in international patent application WO2016/135727 A1. The HMD of FIGS. 2A, 2B and 2C is described in more detail in international patent application WO 2017/179054A1. FIG. 2A is front view of a HMD 200 according to some embodiments of the invention mounted on the head of a user. FIG. 2B is a schematic illustration showing a detailed view of the optical display system shown in FIG. 2A. FIG. 2C is a side view of the HMD mounted on the head of a user. The HMD of FIGS. 2A-2C is in the form of wearable eyewear (e.g., glasses, spectacles, frame, etc.), including user attachment section 210 and partially transmissive partially reflective optical part 212. User attachment section 210 includes a nosepiece 226 configured to support an optical display system securely on the nose of user 1 (optionally via a nosepiece adapter—not shown).

The HMD includes an image generator 230, lenses 234, 236, 238, 240, and 246, and reflectors, e.g. mirrors, 244 and 248 forming an optical arrangement. A framework (not shown) is configured and operative to precisely position the various components in precise relative positions and orientations with respect to each other. Altogether these components may form an optical display system 310 that is operative to project imagery (e.g., images, video, graphical representations, etc.) onto partially transmissive partially reflective optical part 212 that is superimposed or overlaid over the center of the user's field of view (FOV), while keeping the user's field of regard (FOR) intact without the introduction of obstructions (e.g., non optical structural elements), or distortions.

The HMD 200 further comprises an image capturing device such as a camera 205, tracking sensor 222, and electronic control unit 250 described in more detail with reference to FIG. 3. Eye tracking sensor 222 shown in FIG. 2A would usually be one of a pair of such sensors, one for each eye.

Mirror 248 is shown positioned near to the nose of the user 1. In other HMDs a different mirror arrangement may be used with reflectors in other arrangements away from the user's nose.

Partially transmissive partially reflective optical part 212 may be operative to be partially transmissive to light incident on its outer facing surface, while concurrently be partially reflective to light incident on its inner, user facing surface. Partially transmissive partially reflective optical part 212 may have a surface that follows the curvature of an ellipsoid that has at least to two foci, such that at least one focus is configured coincide with a position of an eye (i.e., the pupil) of the user.

Figure 3:
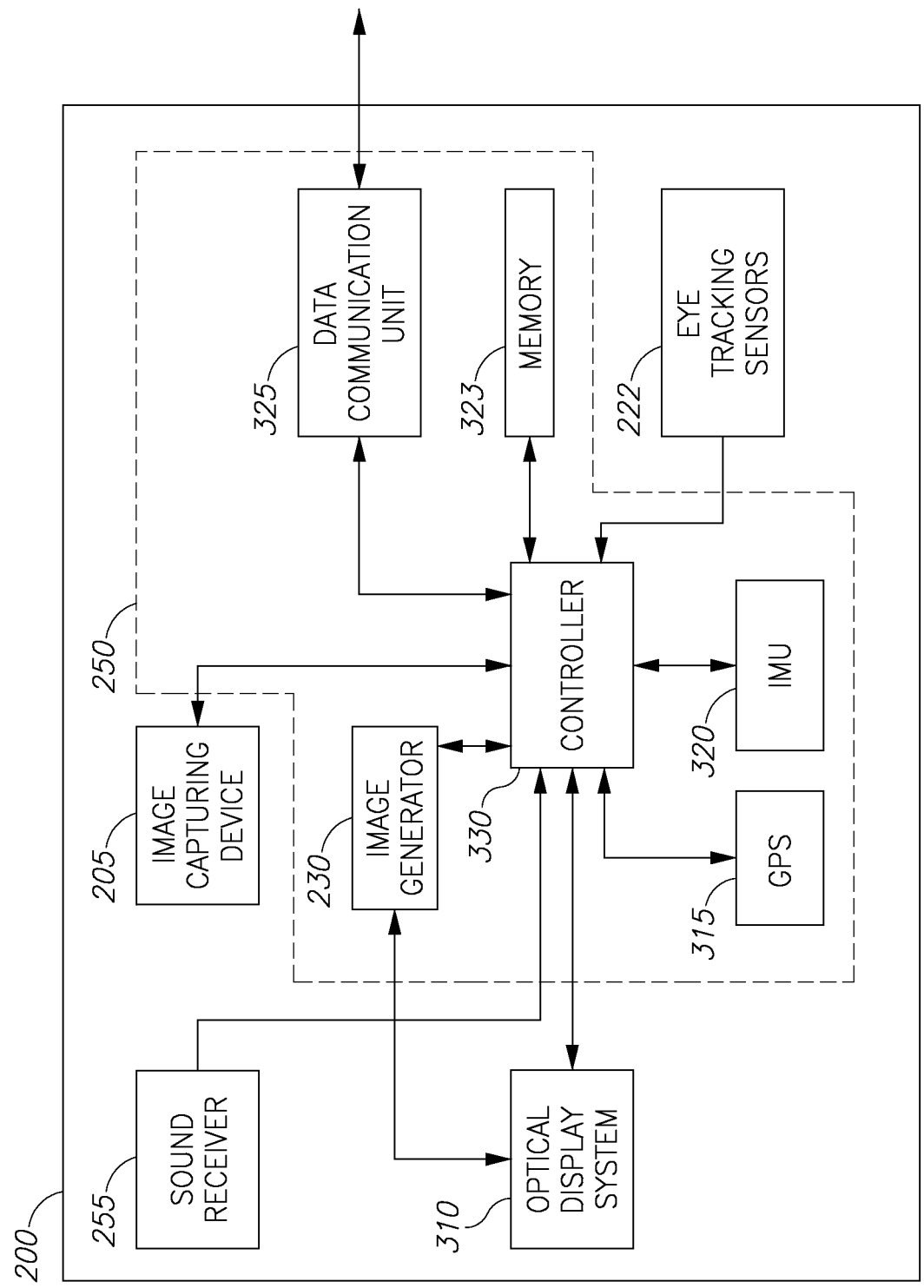
FIG. 3 is a schematic diagram showing components that may be comprised in the HMD of FIG. 2 according to some embodiments of the invention.

FIG. 3 is a block diagram of components that may be comprised in a HMD 200 according to some embodiments of the invention. The components of a HMD 200 according to some embodiments of the invention may be the same as headsets known in the art, configured to operate according to embodiments of the invention. Thus, some embodiments of the invention provide a computer readable medium, transitory or non-transitory, comprising instructions which, when implemented in a processor in a data communication unit of a headset cause the processor to implement methods according to some embodiments of the invention.

It should also be noted that it is not a requirement for embodiments of the invention, unless otherwise stated herein, for the components shown in FIG. 3 to be part of a HMD. In some embodiments of the invention the components may be distributed about the user in various ways as appropriate to the function of the component for example but not limited to in pockets, in peripheral devices such as mobile phones, attached to or embedded in clothing, attached to or embedded in parts of the body other than the head. Thus, the components shown in FIG. 3 are generally referred to as "user equipment" and the term "user equipment" may refer to one or more components, for example as shown in FIG. 3, carried by, embedded in, worn by or attached to a user.

According to some embodiments of the invention, a user may be provided with only a selection of components of user equipment or a selection of components of a HMD as described herein. Thus, for example HMDs used in some embodiments of the invention may include only the minimum components required to perform a particular function, for example to conserve space and thereby enable a more comfortable or stylish design.

In FIG. 3, a HMD 200 may comprise at least one image capturing device 205, or image sensor, such as a CCD array, capable of capturing still or video images. Image capturing device may have a wide FOV for example a 360° camera array or other wide FOV image capturing device or it may have a narrower FOV. The HMD 200 may further comprise an image generator 230, optical display system 310 which may be a wide FOV display, a global positioning system "GPS" unit or other position sensor 315, an inertial measurement unit "IMU" or orientation sensor 320 which may for example output LOS measurements as described further herein, eye tracking sensors 222 which may for example detect eye movements and output signals relating to eye position and rotation, sound receiver 255 such as but not limited to a microphone, memory 323, a data communication unit 325 and a controller 330.

Eye tracking sensors are known in the art and any suitable eye tracking sensor, or pair of sensors, may be used in some embodiments of the invention. One example of a system for eye tracking is shown in U.S. Pat. No. 7,401,920 B1 and a system of this type may be used in some embodiments of the invention. Other suitable systems may be used and will be familiar to those skilled in the art.

Some or all of the components shown in FIG. 3 may be comprised in an electronic control unit 250 which may be mounted on or housed in the user attachment section 210 of a HMD. In the embodiment of FIG. 3, only some components are shown to be comprised in an electronic control unit 250.

In all embodiments of the invention unless otherwise stated the image capturing device may include a collection of individual image capturing devices arranged around a user's body, for example around or on top of his head, optionally as part of a HMD, on the shoulder of the user or at any other location.

FIGS. 4 to 25 show various ways in which the visibility of an anchor may be determined or an anchor may be selected according to some embodiments of the invention. Unless otherwise stated these may be used singly or in any combination.

Figure 4B:
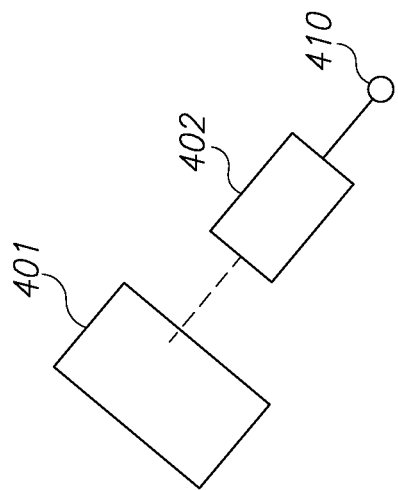
FIGS. 4A, 4B and 4C are perspective, plan and elevation views showing two anchors according to some embodiments of the invention.
Figure 4C:
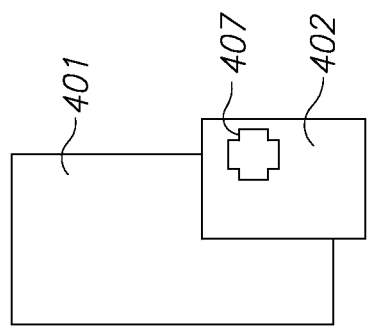
Figure 4A:
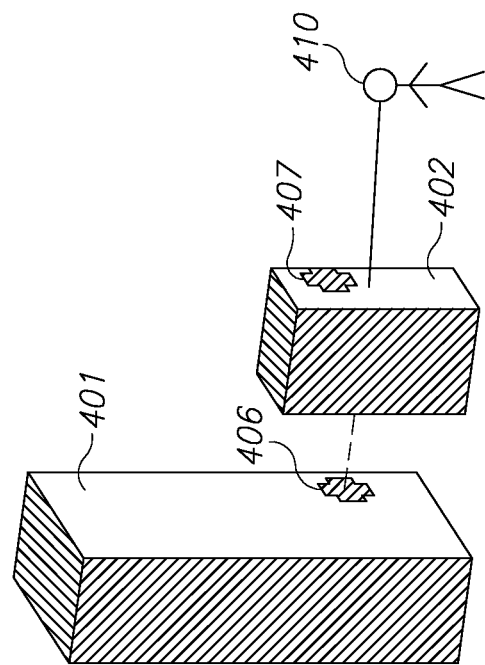

FIG. 4A is a perspective view schematically illustrating how an anchor may be invisible to a user in certain positions. FIG. 4 shows two buildings 401 and 402, both of which are visible to a user 405. Each building has an associated anchor, 406 for building 401 and 407 for building 402. Anchors 406 and 407 are shown as markers on buildings 401 and 402. According to some embodiments of the invention, anchors could take any form, for example whole buildings, parts of buildings such as corners, windows, groups of windows, natural geographical features and so on.

FIG. 4A shows a user 410 standing in a position at which the user's LOS to anchor 406 is blocked by building 402. Thus, while both anchors 406 and 407 may be identified as being in the vicinity of the user, as determined for example by a position sensor in a HMD carried by the user, only one 407 is visible to the user 410 and available for the determination of the user's position. FIG. 4B shows the same relative positions of the user 410 and buildings 401 and 402 in plan view and FIG. 4C shows the buildings 401 and 402 in elevation from the viewpoint of the user 410 as shown in FIGS. 4A and 4B.

Figure 5B:
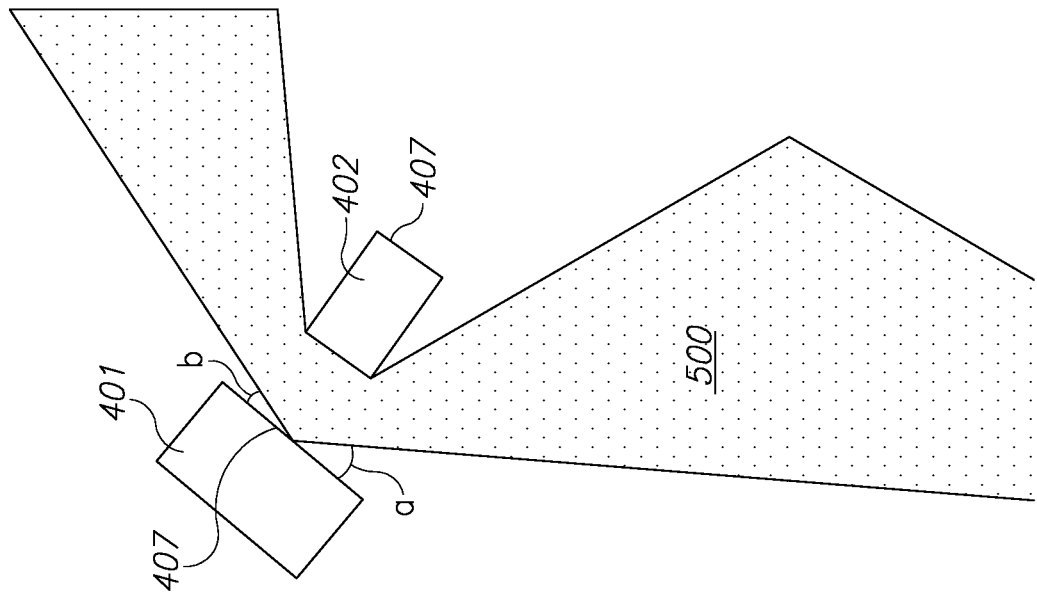
Figure 5A:
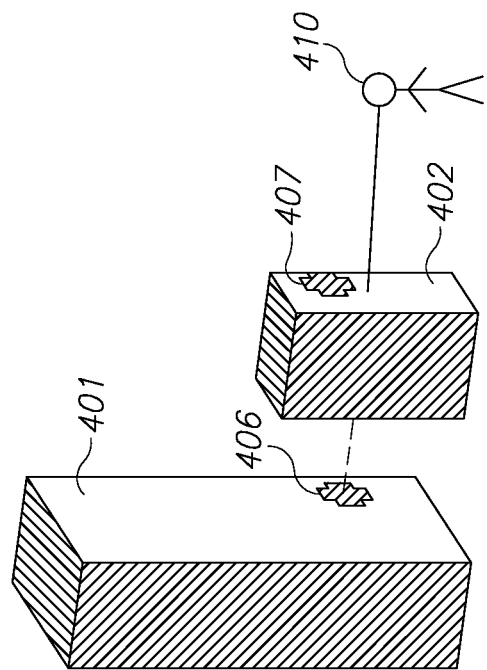

FIG. 5A is a perspective view similar to FIG. 4A and FIG. 5B is a plan view showing an area 500 on the ground containing positions from which an imaging device may have a direct or uninterrupted LOS to the anchor 406. Area 500 may be termed a "visibility clearance" area. This area may be used to determine the visibility of the anchor from a position, for example by determining whether the position is within area 500. In the example of FIG. 5A the area 500 excludes positions at which the LOS would be at an angle lower than an angle a when viewing from the left or b when viewing from the left. Angles a and b may be unequal due to the fact that the anchor 407 is not in the center of the wall of building 402. If the anchor 407 were to protrude from the wall of building 401 then angles a and b might be smaller According to some embodiments of the invention, a HMD may receive a selection of one or more anchors based on received position measurements and optionally orientation measurements, for example all the anchors within a radius of the HMD optionally limited to an angular range. The image capturing device may be activated only when the position and orientation of the HMD indicate that one or more of the selected anchors is visible to, e.g. within the FOV of, the image capturing device.

According to some embodiments of the invention each selected anchor may be received with data relating to its visibility, or visibility data. This visibility data may be time-invariant or time dependent. The selection of anchors may be received at a controller 330 in a HMD, for example from memory 323 at the HMD 200 or from a server described with reference to FIG. 23. This visibility data may be used to determine whether the anchor is visible to the image capturing device. For example, the visibility data may comprise an area associated with each anchor from which an image capturing device may have an uninterrupted LOS to the anchor.

It should be noted that the determination of the area 500 may be based on stationary data only, for example time-invariant data such as the positions of buildings and other permanent structures. The area 500 may be determined in various ways, for example but not limited to based on data sourced from HMDs or using a two-dimensional map of the area. The area 500 may be extended to three dimensions as explained further herein to define a volume from which an anchor is visible, for example using data sourced from HMDs or using a three-dimensional map of the area. Thus according to some embodiments of the invention each selected anchor may be received with visibility data comprising a volume associated with each anchor from which an image capturing device may have an uninterrupted LOS to the anchor According to some embodiments of the invention other data may be used to determine whether an anchor is visible in addition to or alternative to time-invariant data.

According to some embodiments of the invention it may be desirable to exclude or filter out one or more parts of an area or volume in which an anchor is visible for the purpose of position determination or for displaying information to a user. This might be for safety or other reasons. In other words, whether or not an image captured for the purpose of locating a user is visible to a user, it may nevertheless be desirable to avoid the capturing of an image or display of an image while the user is located in certain areas. This is particularly but not exclusively the case if the anchor is to be used also for the display of graphical information to a user such as AR information.

Figure 6B:
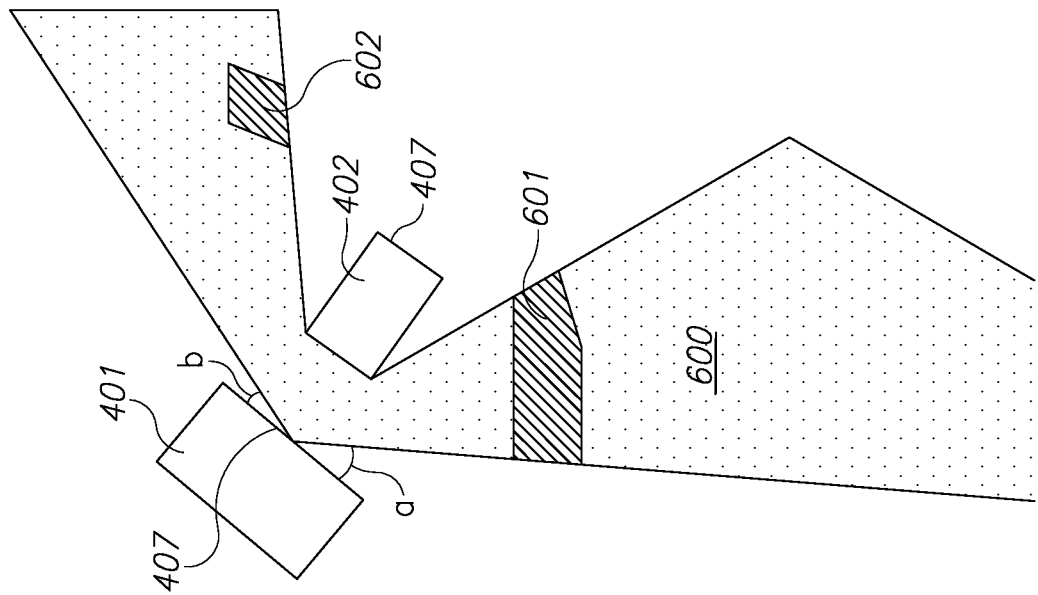
FIGS. 6A and 6B, 7A and 7B, 8A and 8B, 9A and 9B are perspective and plan views showing variously reduced visibility clearance areas for an anchor according to some embodiments of the invention.
Figure 6A:
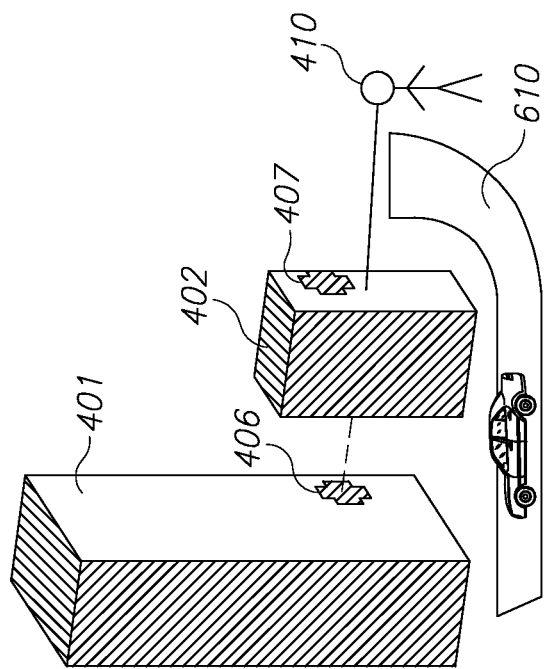

FIG. 6A is a perspective view similar to FIG. 4A additionally showing a road 610 passing in front of building 402 from the point of view of user 410. FIG. 6B is a plan view corresponding to FIG. 6A showing areas 601 and 602 where the road 610 overlaps area 500 in which the anchor 406 is visible. Areas 601 and 602 may be excluded or treated as areas in which anchor 406 is not visible. This may be for various reasons, for example it may not be safe for a user to walk in these areas, it might be preferable to avoid distracting a user while in these areas, or for other reasons whether these areas are roads or otherwise it may be desirable to avoid the possibility of a user standing here.

Figure 7B:
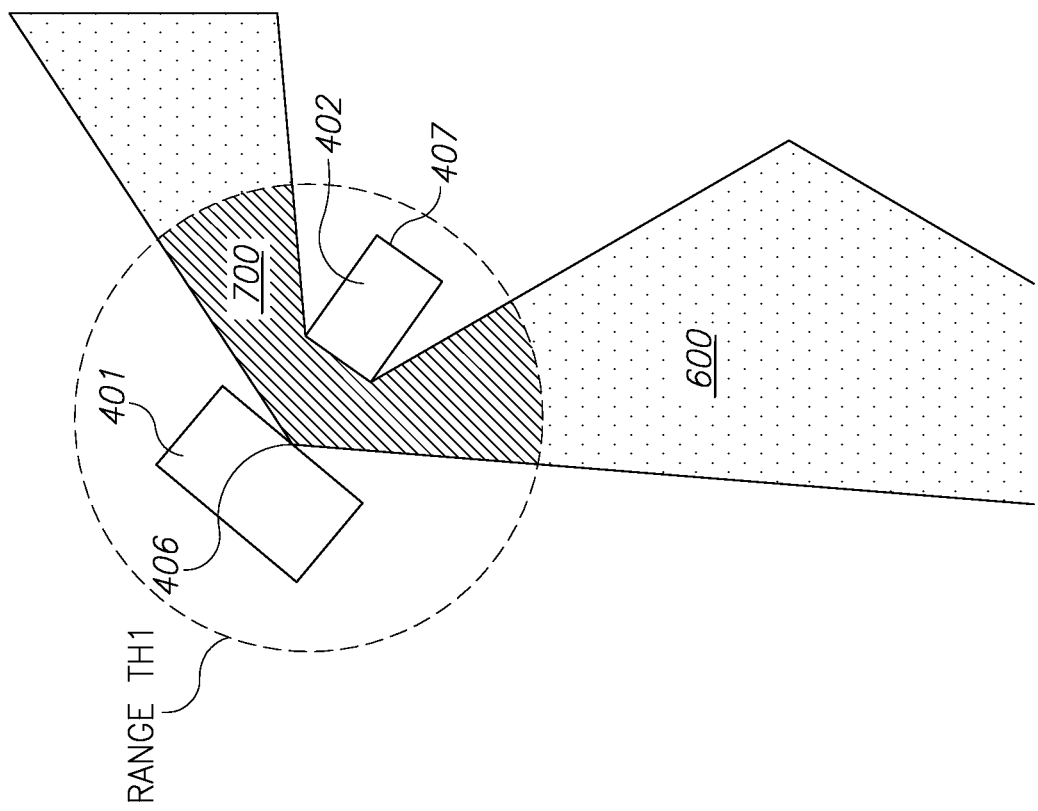
Figure 7A:
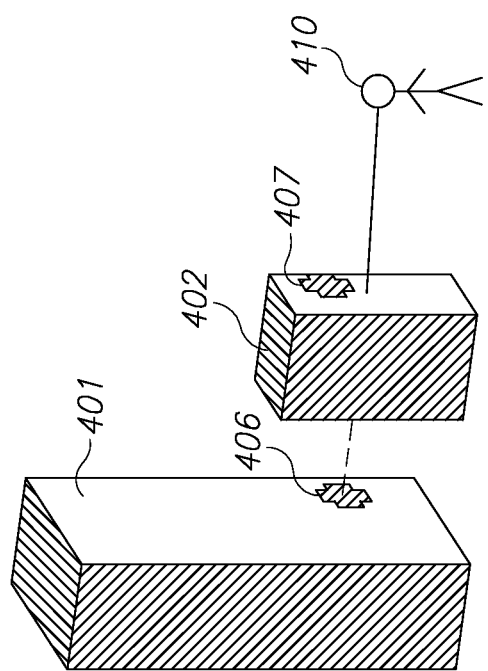

FIG. 7A is a perspective view similar to FIG. 4A and FIG. 7B is a plan view additionally illustrating how the area 600 from which anchor 406 is visible may be limited according to some embodiments of the invention, for example based on a threshold TH1 distance or radius from the anchor 406. The threshold may be determined in various ways. For example, the threshold may be determined, either on the fly or predetermined and for example stored in a database, based on one or more parameters of the anchor.

Anchor parameters may include some measure of the effectiveness of the anchor in assisting in the determination of position and/or orientation. The effectiveness may depend on the size of the anchor, for example a large anchor such as a building may be associated with a large threshold of the order of hundreds of meters and a smaller anchor such as a window may be associated with a smaller threshold of the order of tens of meters. The range threshold may be determined by consulting 3D map data of the area including the user's position and buildings 401 and 402.

The threshold may depend on factors other than size such as but not limited to sharpness of outline or other measure of distinctiveness, contrast with background and any combination of factors. The effectiveness of an anchor may also be determined using data received from HMD wearers.

Some embodiments of the invention may comprise analyzing an image to determine the relative position and orientation of the user equipment to one or more selected anchors, and updating the effectiveness measure of the one or more anchors in the database based on said analysis, for example by reporting to a database such as in memory 323 or database 2302 associated with server 2300. The analysis may be carried out in controller 330.

Figure 8B:
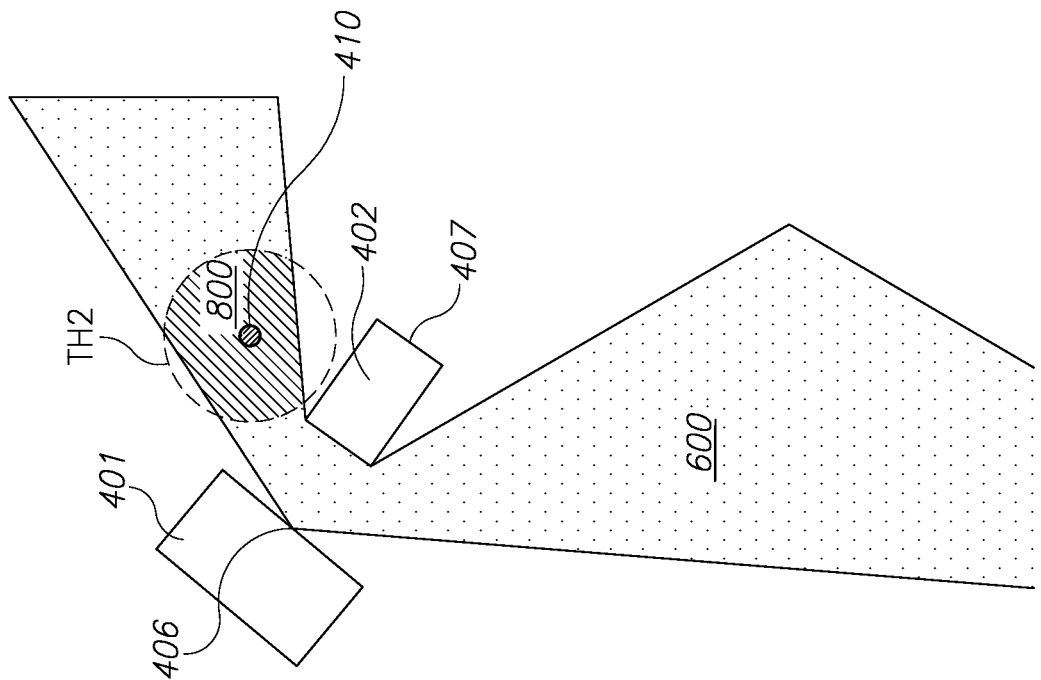
Figure 8A:
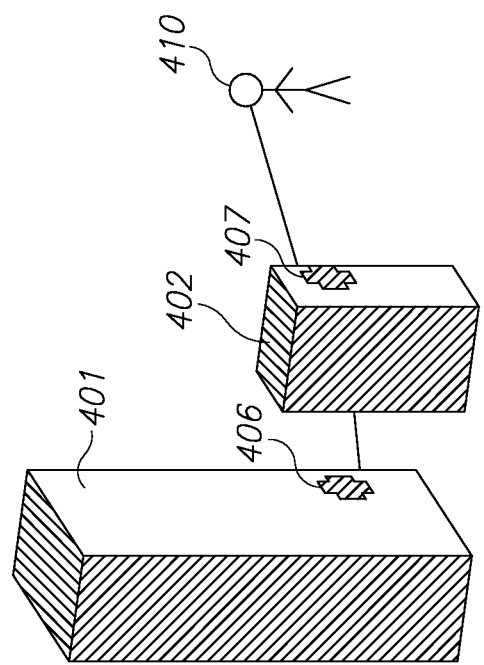

FIG. 8A is a perspective view similar to FIG. 4A with user 410 in a different position in which anchor 406 is not blocked by building 402. FIG. 8B is a plan view corresponding to FIG. 8A additionally illustrating how area 600 may be limited according to some embodiments of the invention based on one or more parameters of user equipment such as one or more parameters of an image capturing device. Thus according to some embodiments of the invention, the determination of the visibility of an anchor may be determined based on one or more parameters of an image capturing device. Those parameters may be received by a component that is to determine the visibility, for example a controller in user equipment or at a remote server or predetermined. In the example of FIG. 8B, an image capturing device or image sensor has a sensing range denoted by radius TH2 and thus the area in which an anchor is "visible" to the image capturing device is represented by area 800 which is where area 600 and the circle with radius TH2 centered on the user 410 overlap. In area 800 neither of anchors 406 and 407 is suitable for the determination of the position of the user 410. Some sensors for example may have a range of only 100 meters. Others may have a longer or shorter range.

According to some embodiments of the invention, any parameter alone such as a parameter of the image capturing device may be used to determine the visibility of an anchor. According to other embodiments, an initial determination may be made based on a first parameter to define a first area in which the anchor may be visible and this first area may be reduced based on one or more further parameters. To take the example of FIG. 8B, the circular area based on the sensing range TH2 may be determined and then reduced to the overlap with area 600 or these operations may be carried out in reverse order.

Figure 9B:
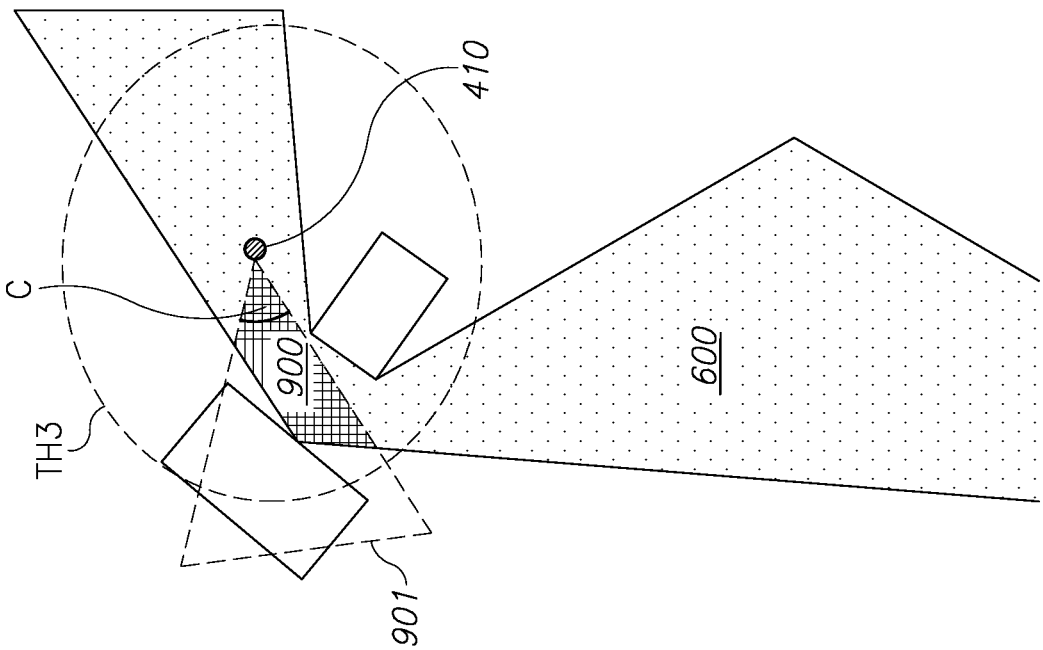
Figure 9A:
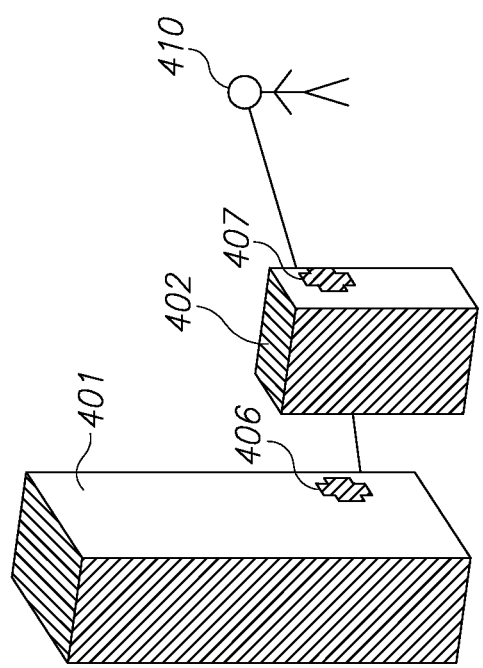

FIG. 9A is a perspective view similar to FIG. 8A and FIG. 9B is a plan view corresponding to FIG. 9A showing how the visibility of an anchor may take account of a different parameter of an image capturing device, in this example the FOV. The FOV is represented by triangle 901. The angular range c of the FOV may be predetermined or received in a similar manner to the range of the image capturing device which is represented in FIG. 9B as TH3. The instantaneous FOV indicated by triangle 901 may be determined from the orientation of the image capturing device determined by an orientation sensor in an HMD carried by user 401. In the example of FIG. 9B, an image capturing device or image sensor has a sensing range denoted by radius TH3 and a FOV indicated by triangle 901 and thus the area in which an anchor is "visible" to the image capturing device is represented by area 900 which is where area 600, the circle with radius TH3, and triangle 901 overlap. In area 900 neither of anchors 406 and 407 is suitable for the determination of the position of the user 410.

Figure 10B:
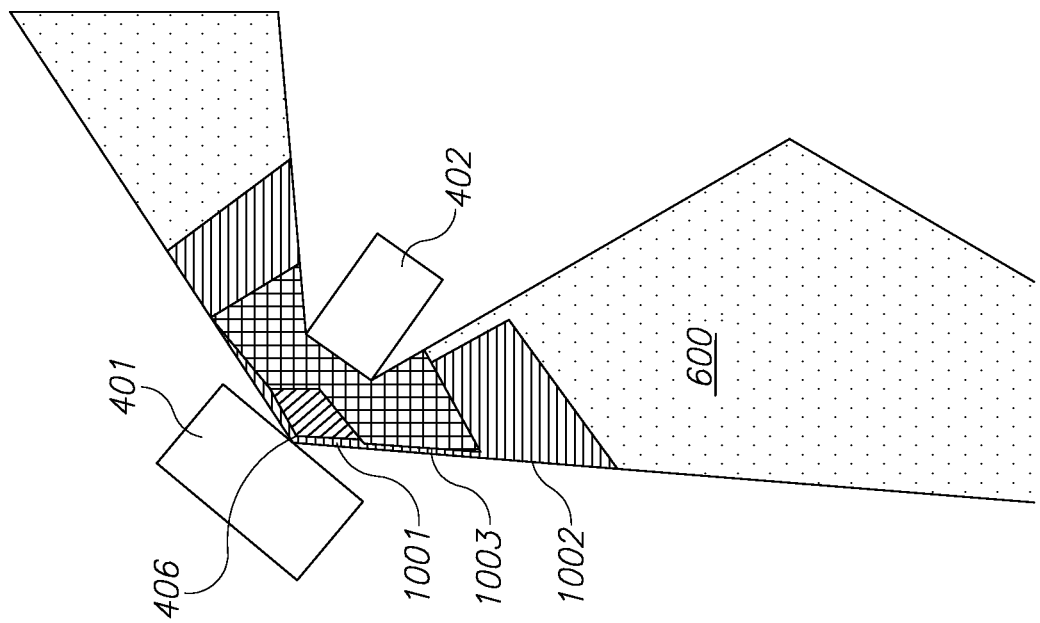
FIGS. 10A and 10B are perspective and plan views showing how the visibility of an anchor may be time dependent according to some embodiments of the invention.
Figure 10A:
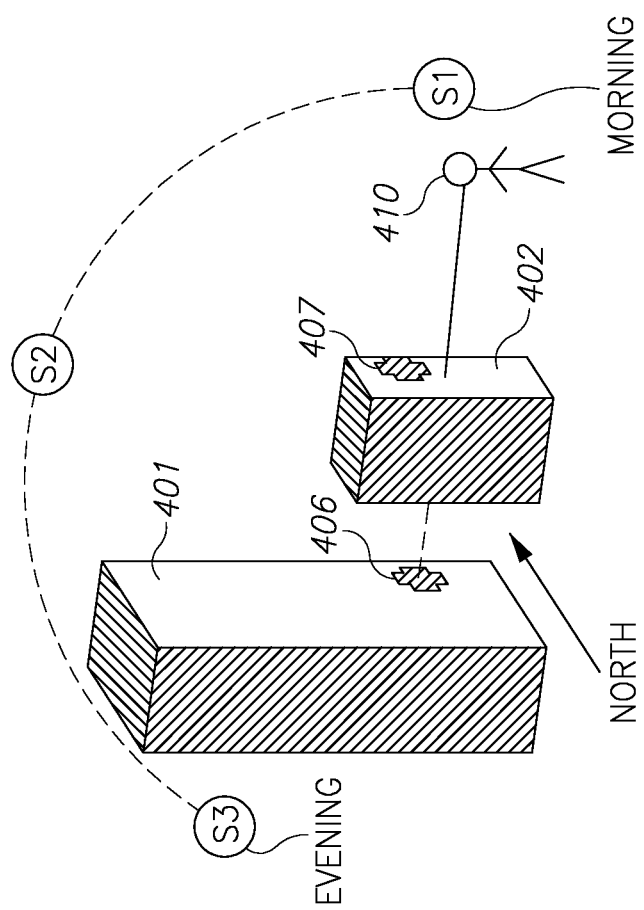

FIG. 10A is a view similar to FIG. 4A and FIG. 10B is a corresponding plan view with user 401 omitted, illustrating how the determination of the visibility of an anchor may according to some embodiments of the invention depend on one or more temporal parameters, in this example time of day. FIG. 10A illustrates schematically the positions of the sun in the morning, S1, around noon S2 and during the evening S3. When the sun rises in the east in the morning (in the northern hemisphere) the anchor 406 is shaded by building 402, during the middle of the day it is at its most visible when the sun is high and during the evening it is again less visible as the sun is behind building 401.

FIG. 10B shows how the area 600 in which the anchor 406 is visible, as determined based on 3D model data relating to the geographical area, may be reduced depending on the time of day. Area 1001 is a subset of area 600 corresponding to when the sun is at position S1 and the anchor is visible only from a small area close to the anchor due to low ambient light conditions. Area 1002 is a larger subset of area 600 corresponding to when the sun is at position S2 and the anchor has maximum illumination and is visible from a larger area including area comprising areas 1001 and 1002. Area 1003 is a subset of area 600 having a size between that of areas 1001 and 1002 and corresponds to when the sun is at position S3.

Other temporal parameters may be taken into account in determining the visibility of an anchor. One example is time of year as explained with reference to FIG. 1 where the state of a deciduous tree 120 may affect the visibility of an anchor. The dependence of visibility on time of day may not be related to the illumination or blockage from sight of the anchor. For example, an anchor may be less visible at certain times of day when the positions at which it may be viewed are crowded with people. Therefore according to some embodiments of the invention the behavior of people at different times of day in a geographical region including an anchor may be taken into account when determining the visibility of an anchor. The behavior analysis may be carried out in many ways, for example through use of surveillance, location data from mobile devices, data from users' HMDs and others.

Thus, according to some embodiments of the invention, received visibility data may be time dependent and the determining whether an anchor is visible may be based on the current time. For example, a controller may receive data determining the relationship between an area or volume and the time (e.g. of day or year) and may then determine the current time to determine a current LOS clearance area or volume from which to determine whether the anchor is visible.

It will be appreciated that the visibility of an anchor may depend on ambient conditions that are not necessarily time dependent. For example, the available light to illuminate an anchor may depend on the weather, e.g. cloud cover, as well as the time of day. Therefore, according to some embodiments of the invention received data relating to the visibility of an anchor may depend on ambient conditions. The ambient conditions may be received, for example in response to a request to a database or server, and the determination as to whether an anchor is visible may depend on the ambient conditions.

FIG. 11A is a view similar to FIG. 4A showing two users 410 and 411 and three anchors, 406 and 408 on building 410 and 407 on building 402, to illustrate the possibility that different anchors may be suitable to locate different users in different locations. FIG. 11B is a plan view corresponding to FIG. 11A. Area 600 represents an area from which anchor 406 is visible for example as determined by time-invariant data, for example by consulting 3D map data as described elsewhere herein. Similarly, area 1100 represents an area from which anchor 407 is visible. If user 411 carries a sensor with a range denoted by circle TH4, the area in which anchors 406 and 408 are visible to the sensor of user 411 is the overlapping part of area 600 with circle TH4. If user 410 carries a sensor with a range denoted by circle TH5, the area in which anchor 407 is visible to the sensor of user 410 is the overlapping part of area 1100 with circle TH5. As illustrated, anchors 406 and 408 are not visible to user 410 and anchor 407 is not visible to user 411.

Figure 12B:
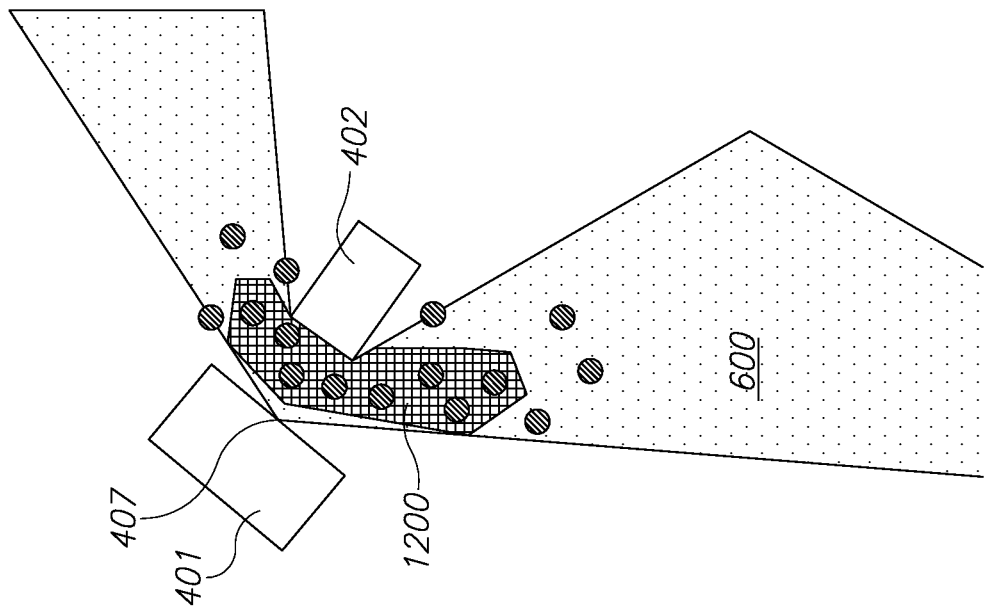
FIGS. 12A and 12B are perspective and plan views illustrating the grading anchors according to some embodiments of the invention.
Figure 12A:
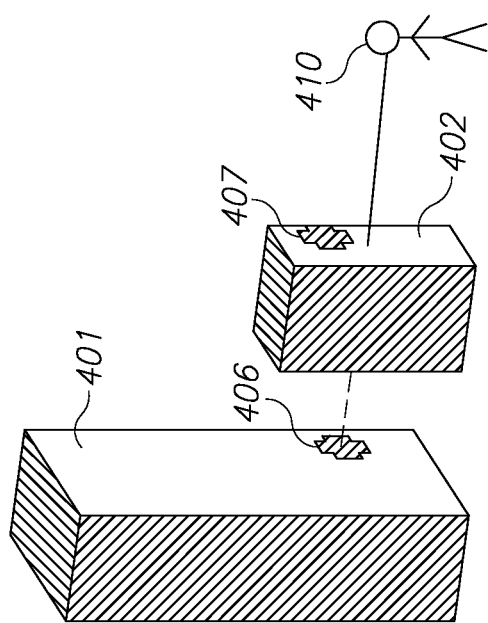

FIG. 12A is a view similar to FIG. 4A and FIG. 12B is a corresponding plan view illustrating how the visibility of an anchor may be determined based on the effectiveness of the anchor in locating a user, for example based on previous attempts to locate a user by means of an anchor. FIG. 12B shows a number of dots corresponding to positions that have been occupied by users in the past and where an attempt has been made to locate a user with the aid of anchor 406. Some of these have been successful and others have not. Area 1200 encloses positions at which anchor 406 was successfully used to locate a user and excludes positions at which anchor 406 was unsuccessfully used. Thus according to some embodiments of the invention, determination of the visibility of an anchor may be based on historical information relating to the effectiveness of an anchor when viewed from various positions.

The success or failure of an anchor to locate a user with the aid of an anchor may be determined in various ways known in the art. For example in some known techniques a captured image of an anchor may be compared to one or more images in a database associated with known locations to find a match and therefore infer the location of a user. Therefore, the success or failure may be based on whether or not a match was found.

Figure 13A:
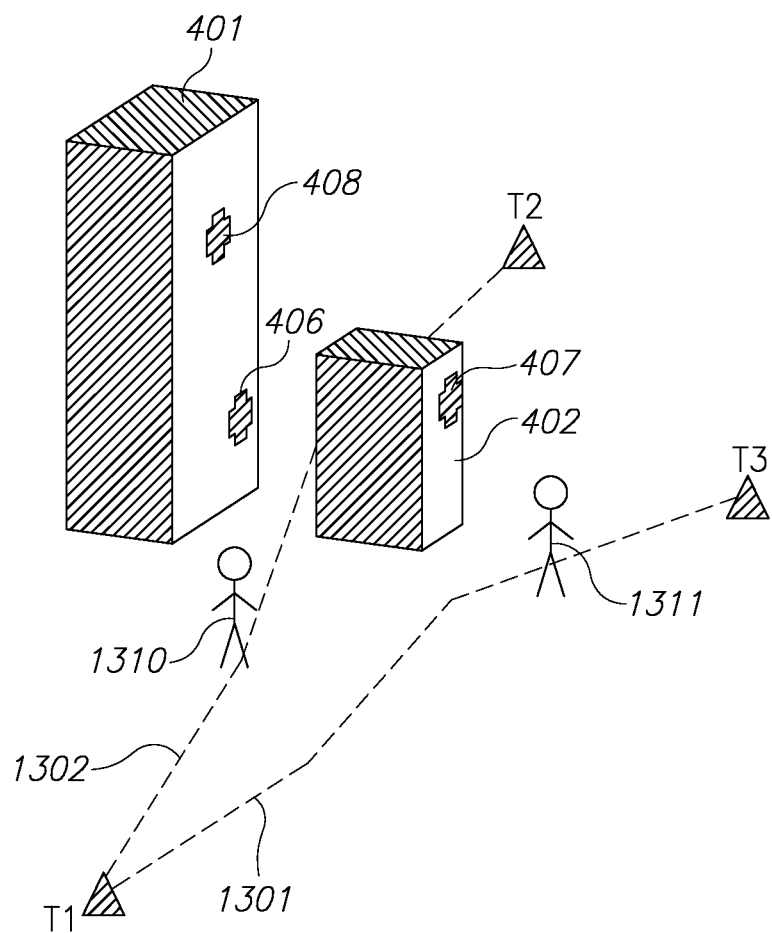
FIGS. 13A and 13B are plan views illustrating selection of an anchor according to some embodiments of the invention.
Figure 13B:
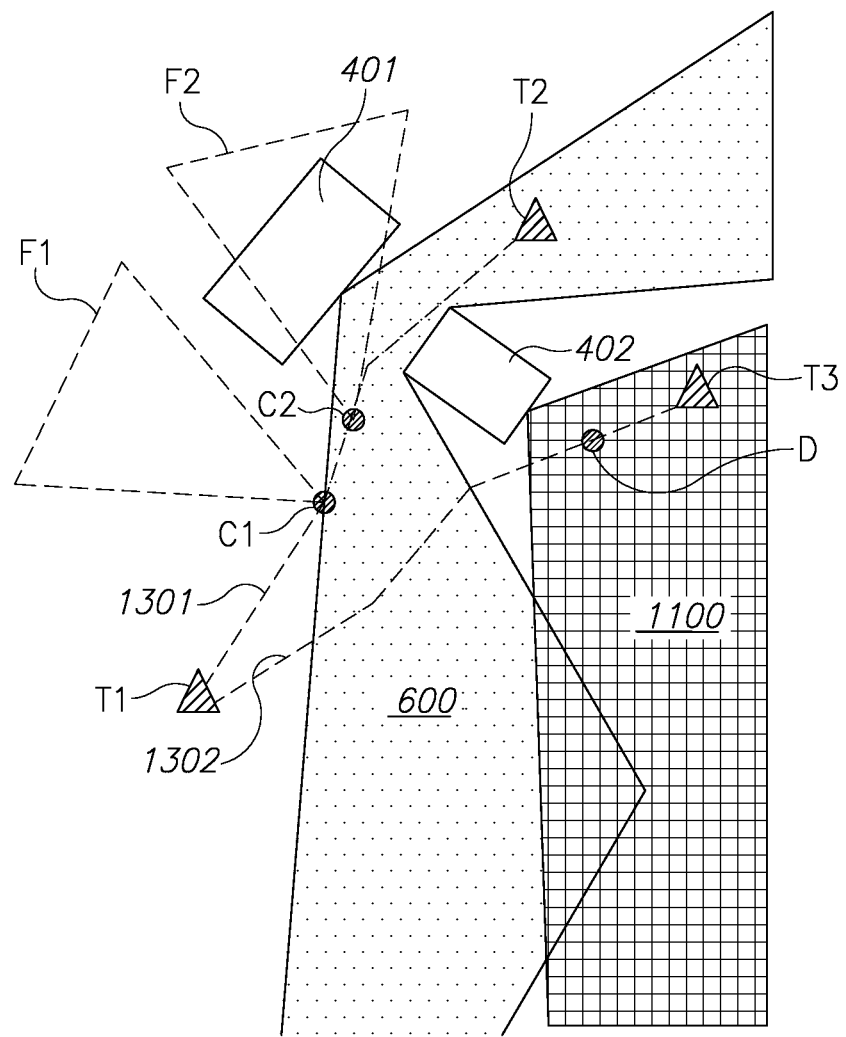

FIG. 13A is a perspective view similar to FIG. 4A showing two users 1310, 1311 walking along respective trails beginning at the same start point T1 and ending at different end points T2 and T3. FIG. 13B is a plan view corresponding to FIG. 13A additionally showing positions along the respective trails. As user 1310 walks or otherwise moves from position T1 towards T2, at position C1 anchors 406 and 408 may be selected as potential anchors for use in locating user 1310. The selection may be based on the position and visibility of each anchor and the current position of the user 1310 or a predicted position of the user. The visibility of the anchors may be determined by reference to an area. Thus, in the example shown in FIGS. 13A and 13B the anchors are selected by reference to area 600 but may in other embodiments be selected by reference to other, e.g. smaller, areas as discussed herein.

According to some embodiments of the invention, an image capturing device may be activated to capture an image including one or more of a selection of anchors when the position and orientation measurements indicate that one or more of the selected anchors is visible to the image capturing device, e.g., in the FOV of an image capturing device and optionally satisfying other criteria such as relating to the time, user, image capturing device and others. For example, as shown in FIG. 13B, a HMD may be configured to track its own position and orientation, for example using position and orientation sensing as known in the art, to determine whether either of the anchors 406 and 408 is within the FOV of the image capturing device, and to capture an image only when this occurs. At position C1, the user is in an area where anchors 406 and 408 are both potentially visible, but at C1 the FOV of the image capturing device as indicated by the triangle F1 does not include either anchor. FIG. 13B shows the FOV of the image capturing device turning from F1 at position C1 to F2 at position C2 as the user 1302 walks towards T2. At position C2, the FOV of the image capturing device as indicated by triangle F2 includes both anchors. At this point an image of the anchors 408 and 406 may be captured. The image may be analyzed to determine the position and orientation of the image capturing device relative to the anchors 408 and 406.

In a possible refinement of the method described with reference to FIGS. 13A and 13B, according to some embodiments of the invention the visibility of an anchor may be determined by reference to a volume rather than an area, which may for example have upper and/or lower bounds, and the LOS of the image capturing device may also be taken into account in determining whether an anchor is in the FOV of the image capturing device, rather than simply position and orientation. LOS may be determined in many ways known to those skilled in the art of HMDs and will not be described herein.

Instead of activating an image capturing device when an anchor is indicated to be in the FOV, according to some embodiments of the invention an image potentially containing several anchors may be captured, for example a plurality of received anchors. Then, for example in order to save on processing power, the image may be analyzed by reference to only one or more anchors indicated to be visible.

Figure 14B:
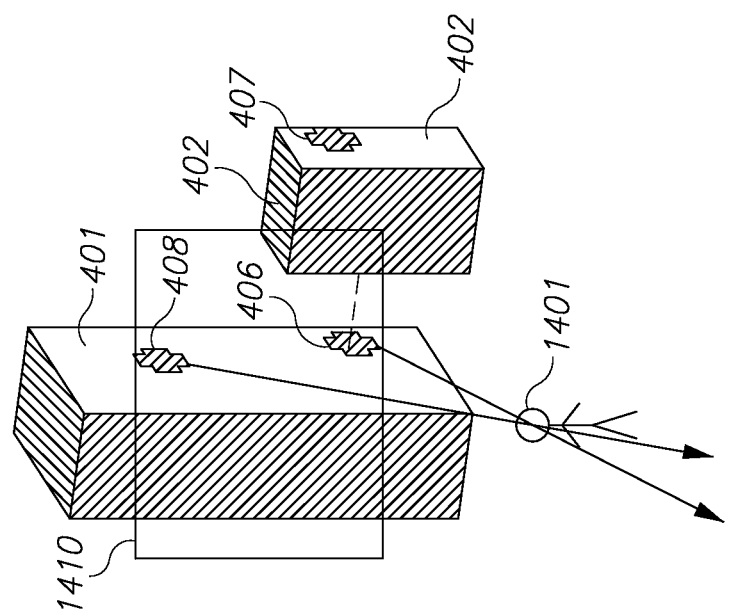
FIGS. 14A, 14B, 15A, 15B, 16A, 16B, 17A and 17B each show perspective views of two buildings and schematic images of the buildings according to some embodiments of the invention.
Figure 14A:
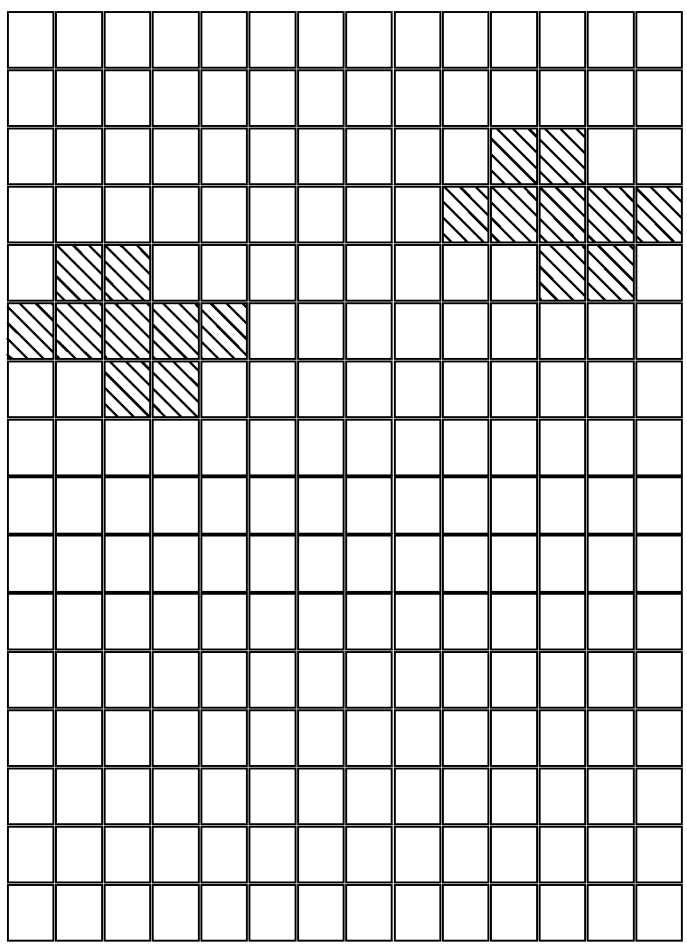

FIG. 14A is a perspective view similar to FIG. 4A showing a user 1401 in a position looking towards anchors 406 and 408. FIG. 14B shows schematically how anchors 406 and 408 might appear on an image capturing device. The FOV of the image capturing device is shown as a rectangle 1410 in FIG. 14A. Where the anchors may appear as cross shapes when viewed from the front, they appear skewed because they are being viewed from an oblique angle. The approximate position of the image capturing device in earth coordinates may be known for example from a GPS sensor in a HMD. The positions of the anchors 406 and 408 in earth coordinates may be known to a greater level of accuracy than is possible using GPS data. The image shown in FIG. 14B may be used to determine the position of the image capturing device, or user, with respect to the anchors 406 and 408 and thereby determine the position of the user with greater accuracy than is possible with GPS data.

FIG. 14B is a simplified diagram in which the image comprises fewer pixels than would be used in a practical image capturing device. The image of each anchor 416, 408 occupies 9 pixels. The number of pixels occupied by the image of an anchor, or the proportion of the total number of pixels in the device, may be used to estimate the distance of the user from the anchor. Where the image capturing device is able to capture two anchors in an image, a triangulation method may be used to determine the user's position with greater accuracy than is possible using only one anchor.

Figure 15B:
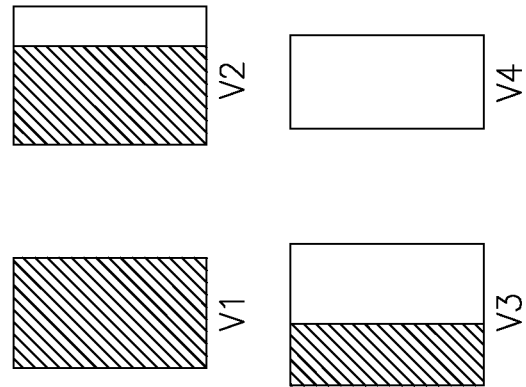
Figure 15A:
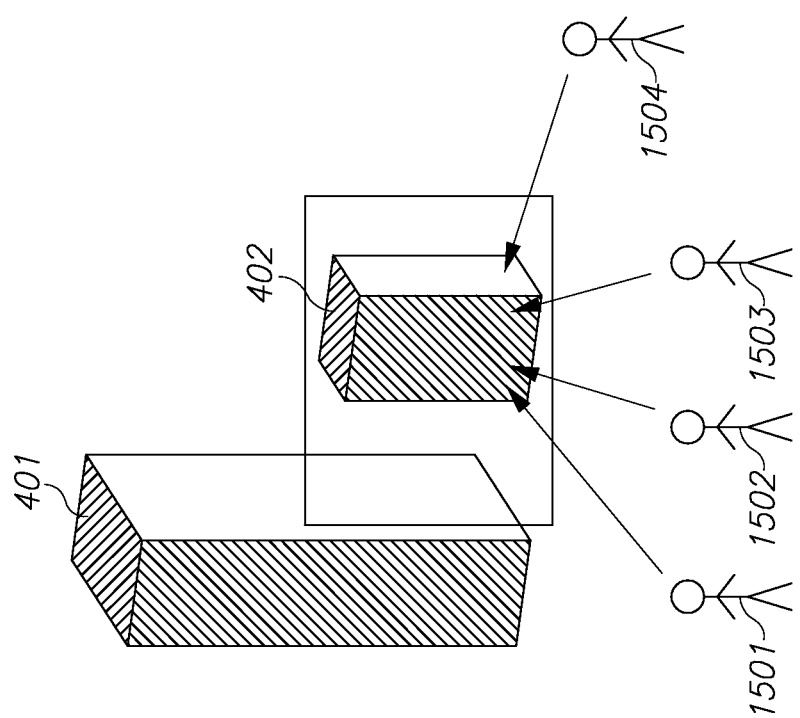

FIG. 15A is a perspective view similar to FIG. 4A showing buildings 401 and 402, and users 1501-1504 viewing building 402 from different orientations. FIG. 15B shows schematically images V1-V4 captured by devices carried by users 1501-1504 respectively. The images may be compared with a 3D model of building 402 to determine the orientation of a user with respect to the building. The building is shown as a simple cuboid for the purpose of explanation. For example, image V1 shows the side of the building as a rectangle implying that the building is being viewed from a LOS perpendicular to the face of the building. At positions corresponding to images V2 and V3, the images include two sides of the building in different proportions. The image captured by user 1504 shows only the second side of the building indicating that the LOS of user 1504 is perpendicular to that of user 1501.

Figure 16B:
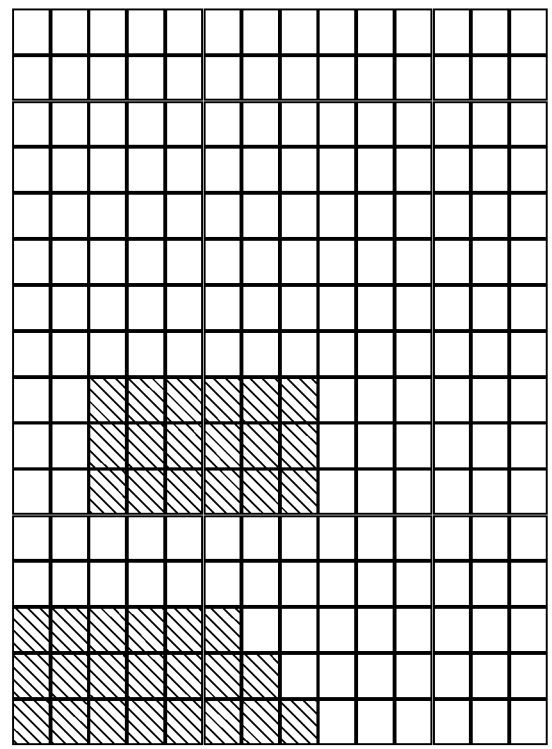
Figure 16A:
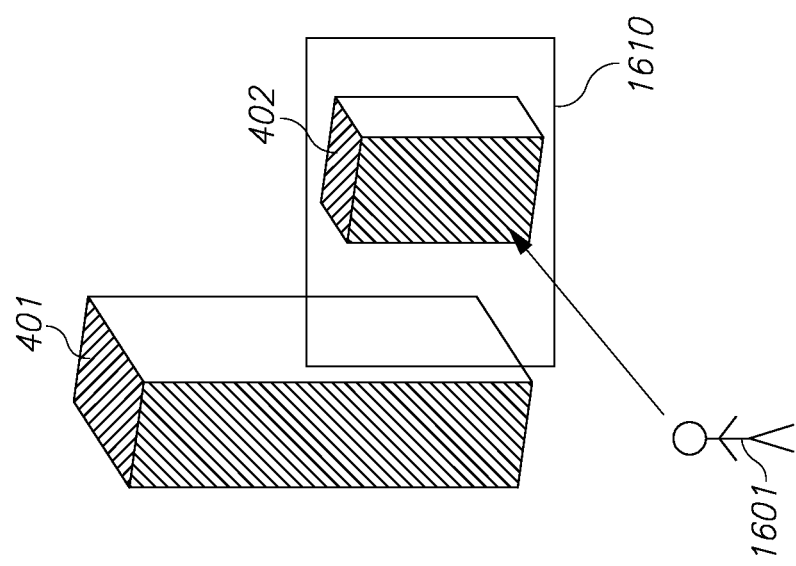

FIG. 16A is a perspective view similar to FIG. 4A showing one user 1601 viewing building 402 and part of building 401 with an image capturing device having a FOV represented by rectangle 1610. FIG. 16B shows an image captured by an image capturing device similar to FIG. 14B. The images of the two buildings occupy different numbers of pixels in the image. This illustrates how the size of the image of an anchor, e.g. in terms of number of pixels, may be used to estimate its distance and the shape can be used to estimate orientation. Thus, according to any of the embodiments of the invention described herein, an image may be analyzed in various ways to determine position and/or orientation of a user with respect to an anchor. FIG. 16B shows that the shape of a 3D object captured by an image capturing device may be used to determine orientation. For example, the shape of the image of building 401 indicates that the user is not straight in front of one building wall. The orientation may be determined from the shape of the image alone. In some embodiments the orientation may be determined by comparing the captured image with a 3D model of an anchor to determine the orientation from which the image was captured. Additionally, or alternatively, the size of the image of the anchor, for example determined by the number of pixels or proportion of pixels occupied by the image of the anchor in the image capturing device. To take the example of building 402 in FIG. 16B, which in this example is itself taken to be an anchor, the 3 pixels width and 6 pixels height indicates the distance from building 402 and the shape indicates the direction, in this example a front view.

Figure 17B:
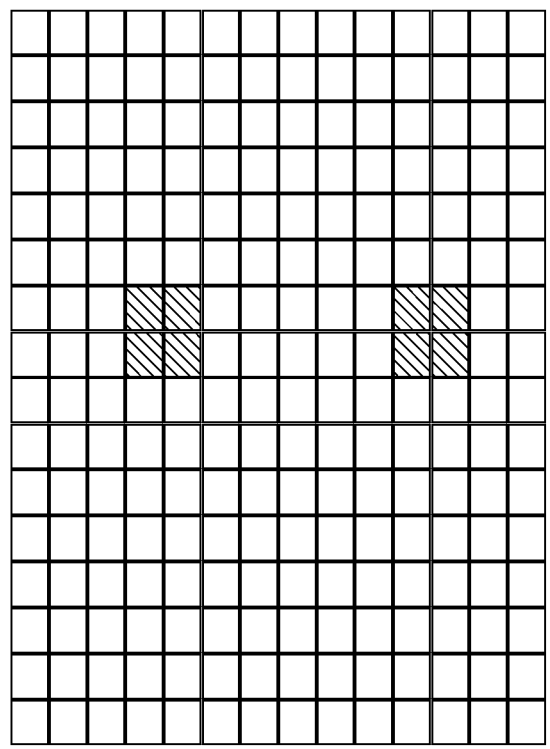
Figure 17A:
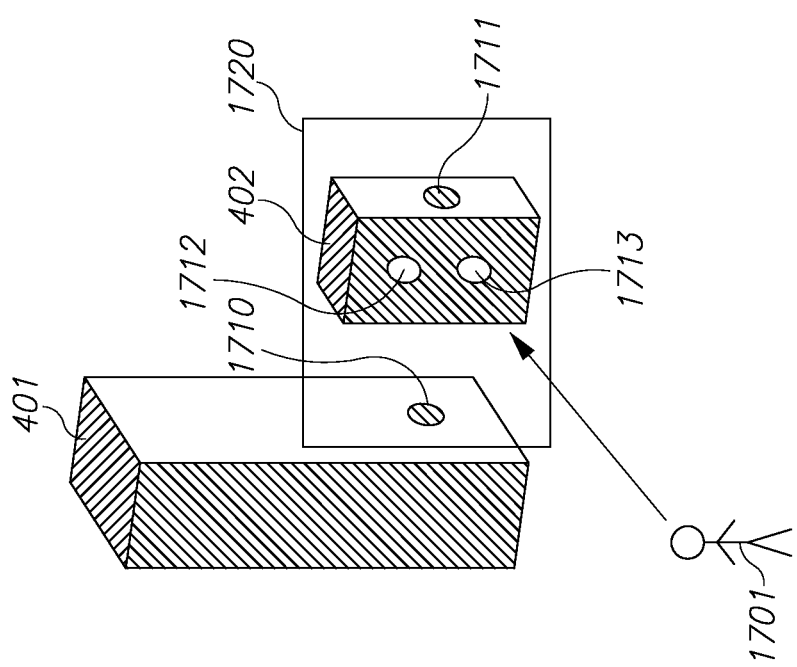

FIGS. 17A and 17B illustrate methods and systems according to some embodiments of the invention in which an anchor comprises a source of radiation. An anchor according to some embodiments of the invention may comprise multiple sources of radiation. In the examples described with reference to the figures each source of radiation is described as an LED but it will be appreciated that anchors in some embodiments of the invention may comprise other sources of radiation and that the radiation may be of any suitable wavelength. Thus, according to some embodiments of the invention selection of an anchor may be received with data relating to the source of radiation, for example known features of the radiation source described herein.

FIG. 17A is a perspective view similar to FIG. 4A. In FIG. 17A, LED 1710 is installed in a lower part of the right-facing wall of building 401 so that it is blocked by building 402 from some viewing positions. LED 1711 is installed in a similar position on building 402. Two LEDs 1712 and 1713 are installed on the front-facing wall of building 402 at different heights. The position and/or orientation of a user with respect to an anchor may be determined using known features of the anchor and/or the image capturing device including but not limited to:

Anchor radiation source features, any one or more of: emission spectrum, intensity, modulation, location, illumination angle;

Image capturing device features, any one or more of: FOV, magnification, number of pixels.

Features of the radiation source may for example be stored in a database to be consulted as part of the analysis of an image of the source. They may also be used in the determination as to whether the anchor is visible to a user. According to some embodiments of the invention, a feature of an anchor need not be visible, or normally visible, to the human eye, for example due to the wavelength of radiation or focal depth. For example, an anchor may comprise one or more such "invisible" or "hidden" features for the purpose of locating a user. One example of such a feature could be a projected pattern. For example, an anchor may comprise a screen such as but not limited to an LCD screen or other information display, and a feature of such an anchor could be a pattern on the screen that is not normally visible to the human eye, for example because the eye would normally focus on the plane of the display.

FIG. 17B shows schematically an image of LEDs 1712 and 1713 captured by an image capturing device with a FOV 1720 carried by a user 1701 standing in front of building 402. Here it is assumed that the LEDs have an illumination angle such that radiation of LED 1710 does not reach the image capturing device of user 1701. Thus, in the embodiment illustrated in FIGS. 17A and 17B, knowing some features of the radiation source or the image capturing device or both it is possible to determine the position of the image capturing device with respect to buildings 401 and 402.

According to some embodiments of the invention a radiation source that forms an anchor or part of an anchor may be modulated in a predetermined manner so that an image of the anchor contains additional information as to the orientation of the image capturing device as compared to an image of an unmodulated source. Various parameters of the radiation may be modulated including but not limited to wavelength, amplitude or intensity, and illumination angle.

Figure 18B:
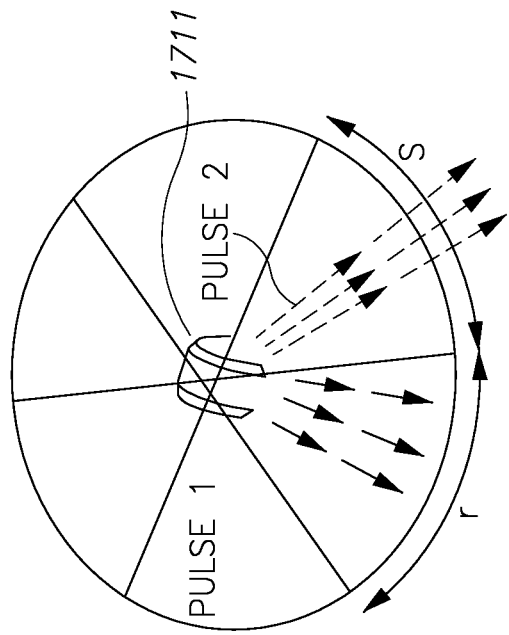
FIG. 18A is a perspective view of two buildings and FIGS. 18B and 18C are schematic diagrams illustrating modulation of radiation according to some embodiments of the invention.
Figure 18C:
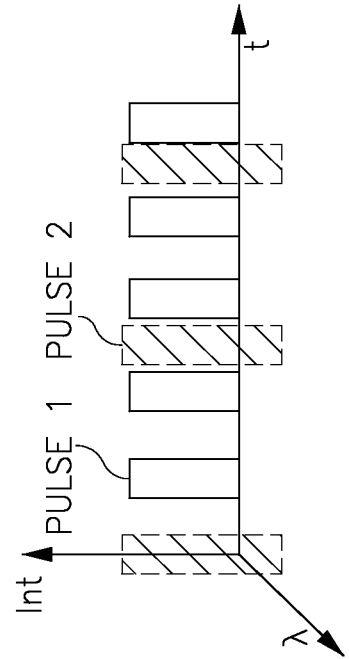
Figure 18A:
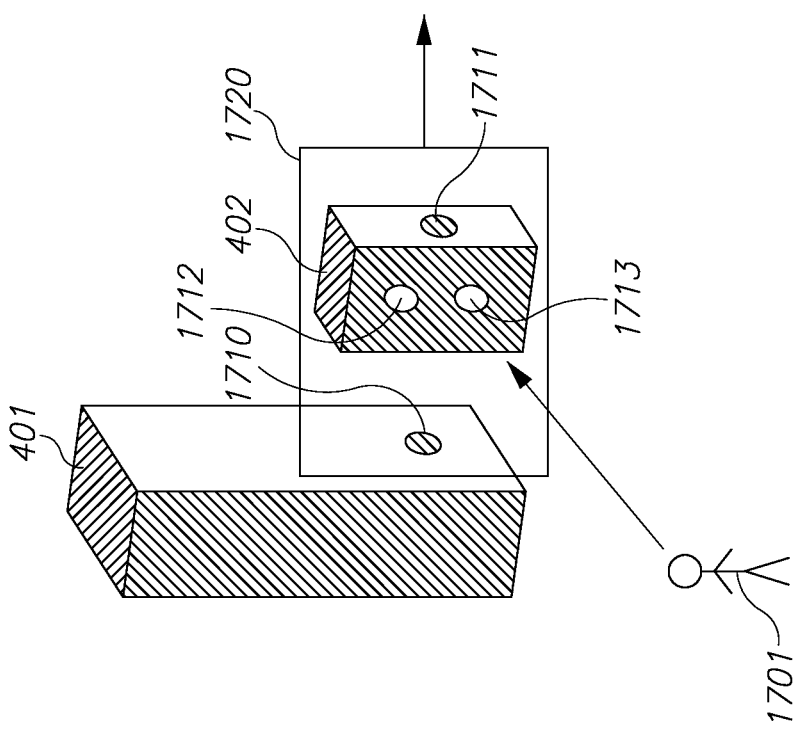

FIG. 18A is a perspective view similar to FIG. 17A. FIG. 18B shows schematically how the intensity and illumination angle of a radiation source may be modulated according to some embodiments of the invention. FIG. 18C is a three dimensional graph showing intensity versus amplitude and time for the radiation source shown in FIG. 18B. In the illustrated embodiment, the wavelength, intensity and illumination angle of a radiation source are modulated. The illumination angle may be divided into sectors. Two sectors are shown in FIG. 18B, r and s, which are non-overlapping and contiguous but which may in some embodiments be overlapping or spaced apart. A radiation source according to some embodiments of the invention may emit radiation in different sectors which is differentiated, for example by timing or wavelength or both. In the example shown in FIG. 18B and 18C, the radiation from sector r is pulsed at a first frequency (pulse 1) and the radiation from sector s is pulsed at a second different frequency (pulse 2). The radiation from the two sectors is also in different wavelength ranges.

It will be appreciated that by modulating the radiation from a source so that radiation from different sectors is differentiated, it is possible to infer orientation information from a single radiation source, or to better infer radiation information from multiple sources.

According to some embodiments of the invention, activation of an image capturing device may be synchronized with transmission of radiation from a source. In some embodiments this may have the advantage of saving power. For example, as well as activating an image capturing device when a particular anchor is likely to be visible, in the case of an anchor comprising a source of radiation, an image capturing device may be activated only when the source of radiation is likely to be detectable. This possibility is not limited to pulsed radiation sources. For example, according to some embodiments of the invention the source of radiation may be visible light and may only be operated at night for example Thus it may be possible to consult a database of features of anchors to determine whether an anchor is likely to be visible at a certain time.

According to some embodiments of the invention, a radiation source as discussed herein may be comprise a display such as but not limited to a liquid crystal display (LCD) positioned in a scene or geographical area providing information hidden to the human eye, for example as described with reference to FIG. 17. Such "hidden" information may or may not be additional to information presented to users via the display, e.g. not hidden. For example, a display may provide a pattern of pixels illuminated for short period of time, the pattern may be captured by the capturing device. A capturing device may calculate position and orientation from the captured image for example based on pattern size, pattern orientation, pattern intensity, or in any other way for example as described herein, as sensed in the capturing device.

According to some embodiments of the invention, an anchor may include a source of acoustic signals such as sound waves. One or more acoustic signals may be used to determine the position of a user in relation to the source and hence the anchor. Position information determined using acoustic signals may augment other information relating to the position of a user derived from an image of an anchor. Some embodiments of the invention may use acoustic signals from one anchor and electromagnetic signals from another anchor to accurately locate a user.

An anchor from which signals are transmitted for use in position determination may be termed an "active anchor" whilst others may be termed "passive".

An acoustic source may be provided in addition to a source of radiation at the anchor. For example, a source of radiation may be used in conjunction with an acoustic device. One example of such an arrangement is shown in FIG. 17 in which an acoustic transmitter 1721 is included. LED 1711 may be coupled to or in proximity to acoustic transmitter 1721. Acoustic transmitter 1721 may transmit a sound wave which may include a time tag indicating the time of transmission. The sound wave may be inaudible to the human ear. An acoustic capturing device or sound receiver 255 such as a microphone which may be included in a HMD may receive the sound wave with the time tag and the delay time between transmitting the sound wave and receiving the same sound wave at the capturing device may be calculated. The delay time corresponds to the range between the capturing device and the anchor. The sound wave time of flight (TOF) is the time that took the sound wave to travel the distance between the anchor and the capturing device. According to some embodiments of the invention, the delay time or the TOF of the sound wave may be achieved by synchronizing clocks associated with the anchor and the capturing device respectively. Synchronizing may be achieved in different ways including but not limitted to using the LED flash light modulation and using an GPS internal clock. A capturing device receiving the acoustic wave with the time tag may calculate the TOF between the transmission and the arrival time to provide range estimation. By fusing information derived from an anchor with a radiation source such and information derived from an anchor with an acoustic source, which may be the same anchor, a more accurate position and orientation may be achieved. For example, this may overcome some problems encountered in particular weather conditions, for example when visibility conditions are not sufficient to allow anchoring using an image capturing device or other electromagnetic radiation sensing.

According to some embodiments of the invention, the transmitting time of an acoustic signal, e.g. sound wave, may be obtained from a database containing details of the anchor including a transmission schedule.

One or more other signal sources may be provided as part of an anchor in addition to or alternative to an acoustic signal source. Such other signal sources may include but are not limited to an RF source such as a short-range RF source, e.g. Bluetooth.

It will be appreciated that a combination of one or more active anchors, such as one providing illumination (LED or other) and one with a source of acoustic signals, together with one or more passive anchors may provide a comprehensive solution to cover all weather all scenarios where position and orientation calculations are needed.

According to some embodiments of the invention the visibility of an anchor may be determined by reference to an area from which it is visible, for example as shown in FIG. 5B, which may be limited based on additional parameters or factors as described herein. Each anchor may be mapped to an area. According to some embodiments of the invention the visibility of an anchor may be determined by reference to a volume from which it is visible and to which the anchor is mapped. In other words, an area from which an anchor is determined to be visible may have a "ceiling" and possibly a raised floor. Any of the bounds of a volume may be limited based on the same additional parameters or factors discussed herein in relation to areas.

Figure 19:
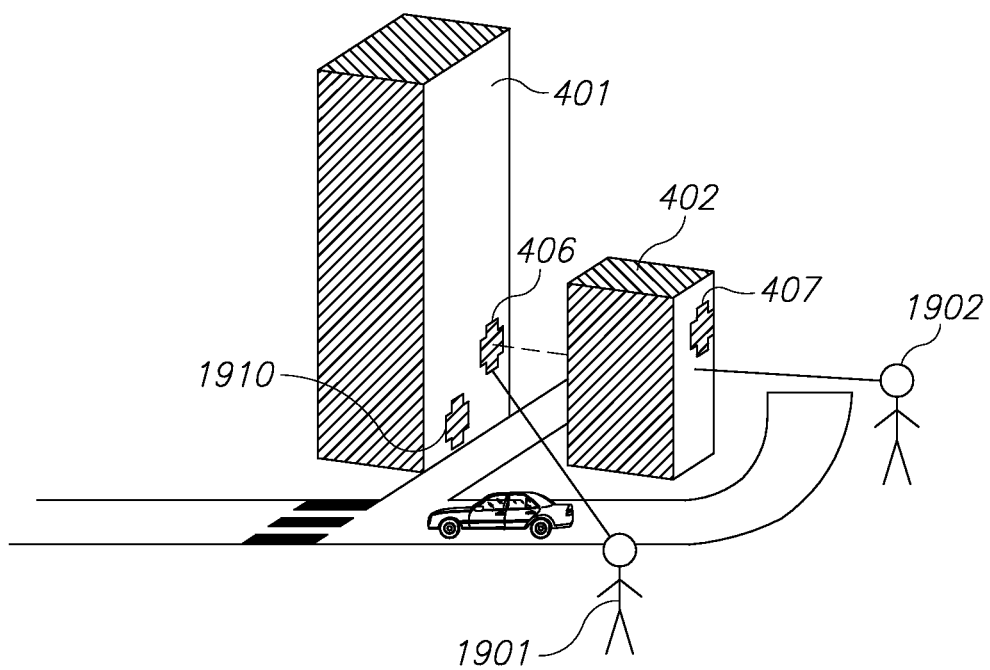
FIG. 19 is a perspective view similar to FIG. 6A showing two users at different positions.

The usefulness of a visibility volume is apparent from FIG. 19 which is a perspective view similar to FIG. 6A showing two users 1901 and 1902 at different positions. In the embodiment of FIG. 19A there are two anchors, 406 and 1910 on building 401. Anchor 1910 is close to street level. Both anchors 406 and 1910 are at different levels from anchor 407. Since the anchors are at different levels, or heights, the volumes of space from which they are visible may have different upper and lower bounds.

FIG. 20 is a perspective view showing two users, 2001 and 2002, of different heights, walking between a first building 2010 and a row of three buildings 2015. A possible mapping of an anchor 2020 to a volume is shown. The size and shape of the volume may depend on any one or more of anchor time-independent parameters such as range (maximum and/or minimum), height (maximum and/or minimum), stationary blockage (2D or 3D), angular visibility, positions that cannot be occupied by a user, and others; user or image capturing device parameters or characteristics such as sensor range, user height, minimal sensor height and others; and time-dependent parameters such as those described herein including any one or more of: caused by moving objects such as traffic and/or people at busy times, temporary blockages, weather, season and others.

Some embodiments of the invention may comprise receiving any of the characteristics, parameters and factors described herein, for example but not limited to by user input, from a remote server of from local memory, wherein determining whether an anchor is visible is based on any of those received characteristics, parameters or factors.

A maximal volume in the form of a polyhedron 2021 is shown in FIG. 20. This may be based solely on time-independent parameters although this is not necessarily the case. The maximal volume 2021 may be reduced by taking into account additional parameters as discussed herein. This is shown schematically in FIG. 20 by the cuboid 2030 within polyhedron 2021.

It will be appreciated that the areas and volumes described herein are not limited to polygonal or polyhedral shapes and may include curved surfaces.

FIGS. 21A-21D show the selection of an anchor based on predicted position and/or direction according to some embodiments of the invention.

Figure 21B:
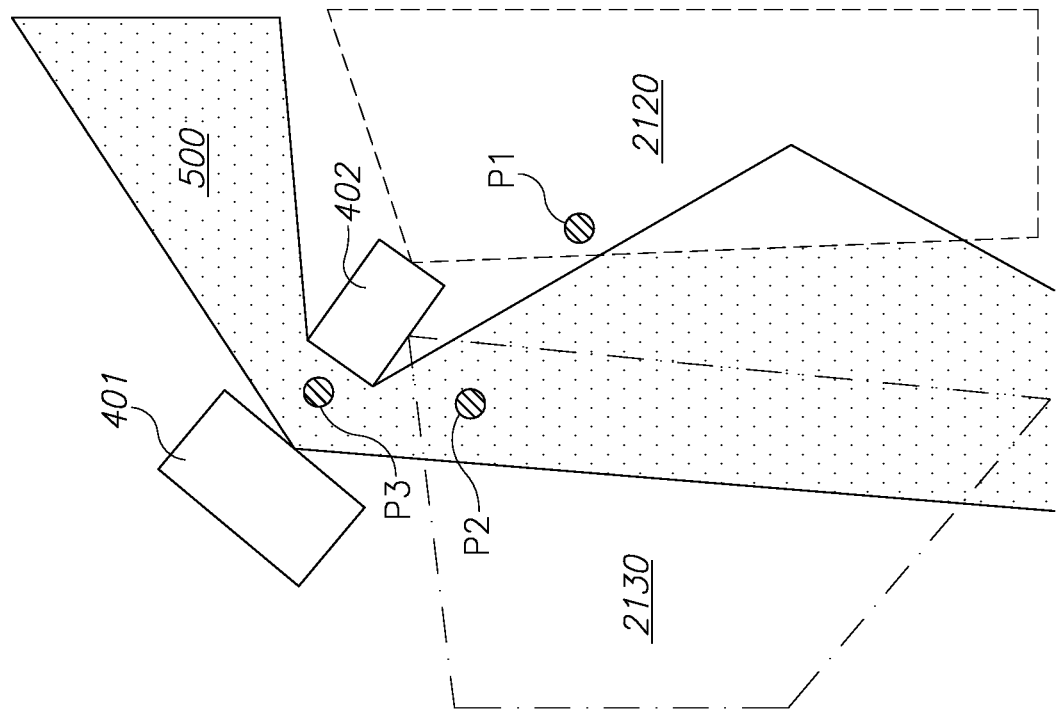
FIG. 21A and FIGS. 21B-D are a perspective and plan views showing selection of anchors according to some embodiments of the invention.
Figure 21A:
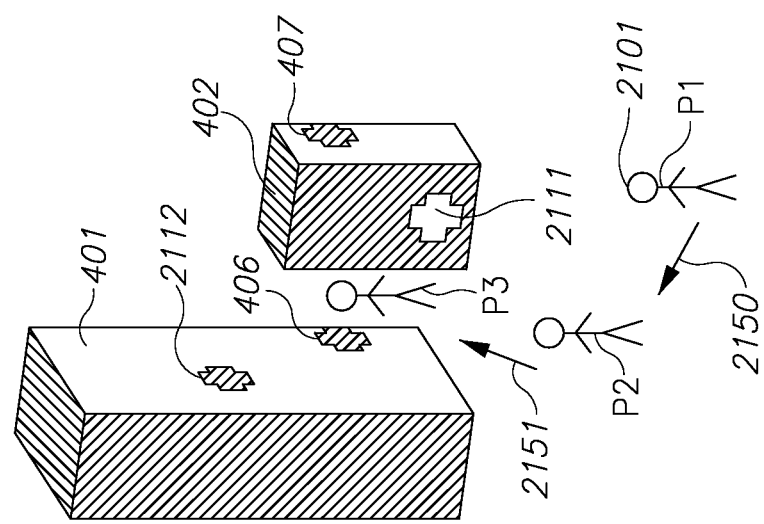

FIG. 21A is a perspective view similar to FIG. 4A in which building 401 has an additional anchor 2112 and building 402 has an additional anchor 2111. Area 2120 is an area to which anchor 407 is mapped. Area 500 is the area to which anchor 406 is mapped and area 2130 is an area to which anchor 2111 is mapped.

FIG. 21A shows a user 2101 moving in the direction of vector 2150 from position P1 in area 2120 to P2 in areas 500 and 2130, and then in the direction of vector 2151 from position P2 to P3 in area 500. FIG. 21B is a plan view corresponding to FIG. 21A.

At position P1 an image capturing device carried by user 2101 may be able to detect anchor 407. However, analysis of the direction of movement of the user, for example by processing position and/or orientation data in a HMD, may indicate that the user is moving in the direction of vector 2150. It may therefore be the case that anchor 407 is not in the FOV of the image capturing device for long enough to be able to locate the user using anchor 407.

According to some embodiments of the invention, the selection of one or more anchors may be based on a prediction of one or more of position, orientation or LOS, or direction of movement of one or more of position, orientation and LOS or both prediction and direction. In this way the image capturing device may be "prepared" to look out for a selected anchor as the image capturing device moves into an area or volume in which an anchor is determined to be visible. The prediction may be based on rate of change of any of position, orientation and LOS and may also take account of historic user behavior.

Thus, at position P1 in FIG. 21B the selection of an anchor may be based on predicted location, P2 and therefore both of anchors 2111 and 406 may be selected, following which the image capturing device may be activated when either one of them is expected to be visible to the image capturing device, for example within the FOV of the image capturing device.

Figure 21C:
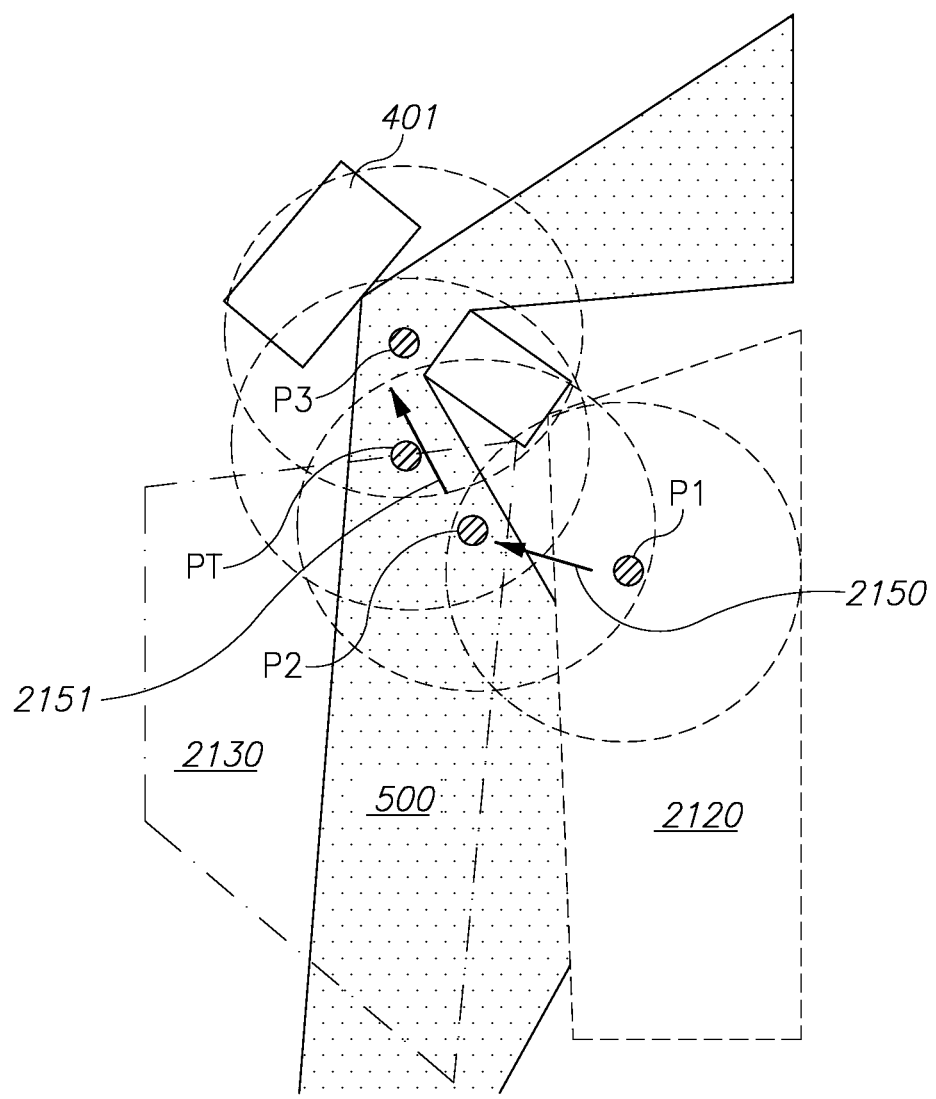

FIG. 21C is a plan view similar to FIG. 21B with an additional point PT along the path of travel of the user 2101. FIG. 21C additionally shows the image capturing device to be limited to a radius denoted by circles centered on each point. At position P2, the user, or image capturing device is within both of areas 500 and 2130 and may therefore have a clear or uninterrupted LOS to either of anchors 2111 and 406. However only anchor 2111 is within the range of the image capturing device. Therefore anchor 406 may be excluded from a selection of one or more anchors received at the image capturing device. This may be done in various ways. For example, an anchors server may store parameters of image capturing devices so that when requested to provide a selection of an anchor it may also receive information identifying the image capturing device and use this information to determine that an anchor is not visible and therefore exclude such an anchor. Alternatively, according to some embodiments of the invention, a selection of anchors may be received at user equipment and one or more anchors may be excluded based on one or more parameters of the image capturing device. The same applies to other parameters which may be used to determine the visibility of an anchor. Either an anchor may be excluded from an initial selection at a server or it may be excluded at user equipment.

At position PT shown in FIG. 21C, both of anchors 2111 and 406 are within the range of the image capturing device.

It will be noted that there is an area between anchors 2111 and 406 in which neither anchor is visible. This may be termed a "dead zone". According to some embodiments of the invention, areas in which no anchor is visible may be determined so that no attempt is made to capture an anchor or determine whether an anchor is visible and hence waste processing power when a user is in such an area. For example, this may be notified to a HMD controller either from an internal database, such as in memory 323, or from a remote server such as anchors server 2300.

For areas where no anchor is visible to an image capturing device, another method for accurately locating the device may be used. One possibility is a dead reckoning method. Thus a system according to some embodiments of the invention may include a pedestrian dead reckoning mechanism which is based on steps detection and stride length and direction estimation. Incorporating such a mechanism with other positioning information (e.g., GPS, or anchor based as described in this patent) may improve the system positioning accuracy and maintain reasonable accuracy for reasonable distances where anchors are not available. An example of a dead reckoning mechanism is described in US20150204673 A1 entitled "Multiple data sources pedestrian navigation system".

Figure 21D:
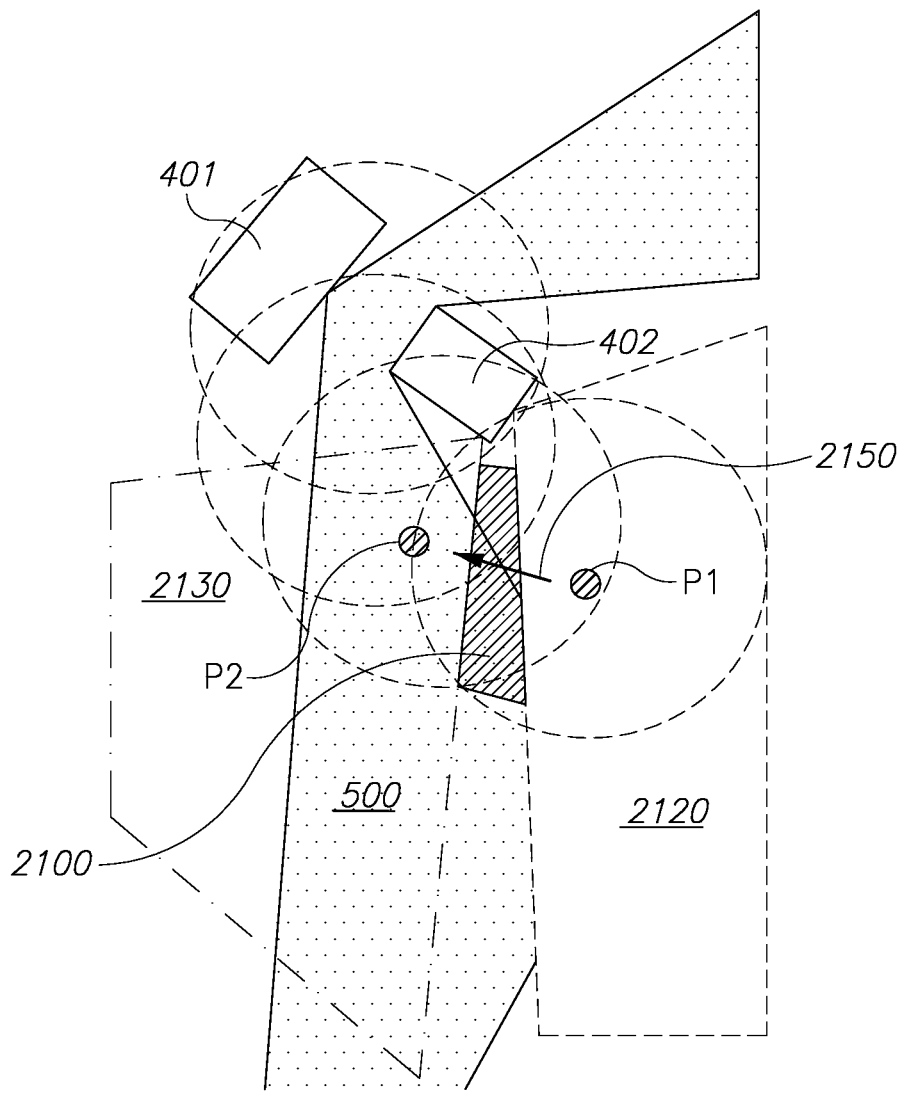

FIG. 21D is a plan view similar to FIG. 21C showing an area 2100 in which no anchor is visible to an image capturing device of limited range as shown. According to some embodiments of the invention, popular routes of users may be determined using data received from user equipment including any one or more of position, orientation and LOS. It is then possible to determine whether there are dead zones on popular routes, and possibly remedy this by creating additional anchors that are visible from previous dead zones.

Figure 22:
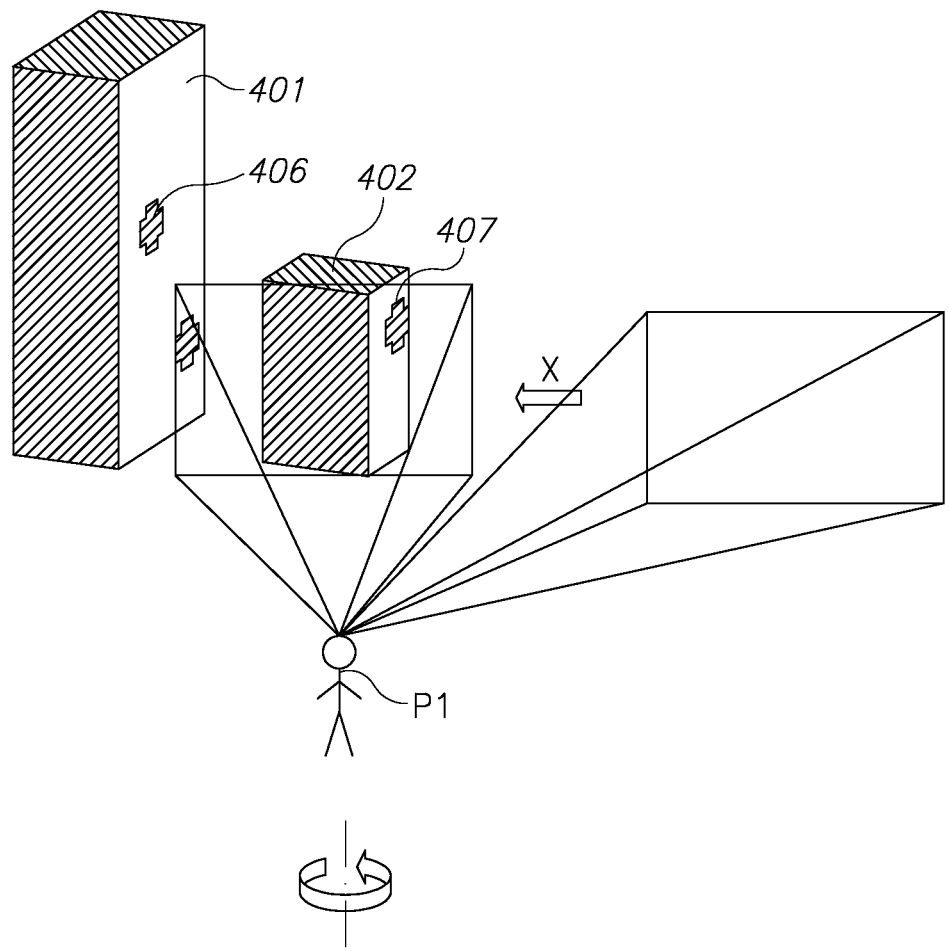
FIG. 22 is a perspective view of two buildings showing LOS prediction according to some embodiments of the invention.

FIG. 22 illustrates how predicted orientation may also be taken into account when selecting one or more anchors. FIG. 22 shows the FOV of an image capturing device indicated by a rectangle moving in direction X from a position in which no anchors are visible to a position in which anchors 407,2111 and 406 are visible, for example as a result of a HMD turning left in azimuth. This turning movement may be tracked, for example by a controller within a HMD, to prepare an image capturing device to capture an image of anchors 407 and 2111 for example.

According to some embodiments of the invention, the velocity (e.g. angular or linear) or likely resting time of the image capturing device on an anchor or both may be used to select an appropriate moment at which to activate an image capturing device. The resting time may be determined for example from the historic behavior of a user.

An important aspect of some embodiments of the invention is the use of anchors in a dynamic environment in which the user is able to move about, for example from a first position in which a first set of anchors is visible to a second position in which a second set of anchors is visible. Thus, some embodiments of the invention provide methods and systems in which different anchors may be used at different locations along a path of travel of a user, or path of travel of a user's head or gaze. The use of anchors according to some embodiments of the invention, including for example predicting the travel of the user or the user's head or gaze, or arranging anchors to avoid locations where no anchor is visible, may provide continuity in precisely locating a user.

According to some embodiments of the invention, the frequency of determination of position or orientation relative to an anchor may depend on the purpose. For example if it is simply desired to refine a GPS or IMU measurement it might be less frequent than if the determination is for use in AR and it might depend on the kind of AR such as gaming or providing emergency information to users.

Figure 23:
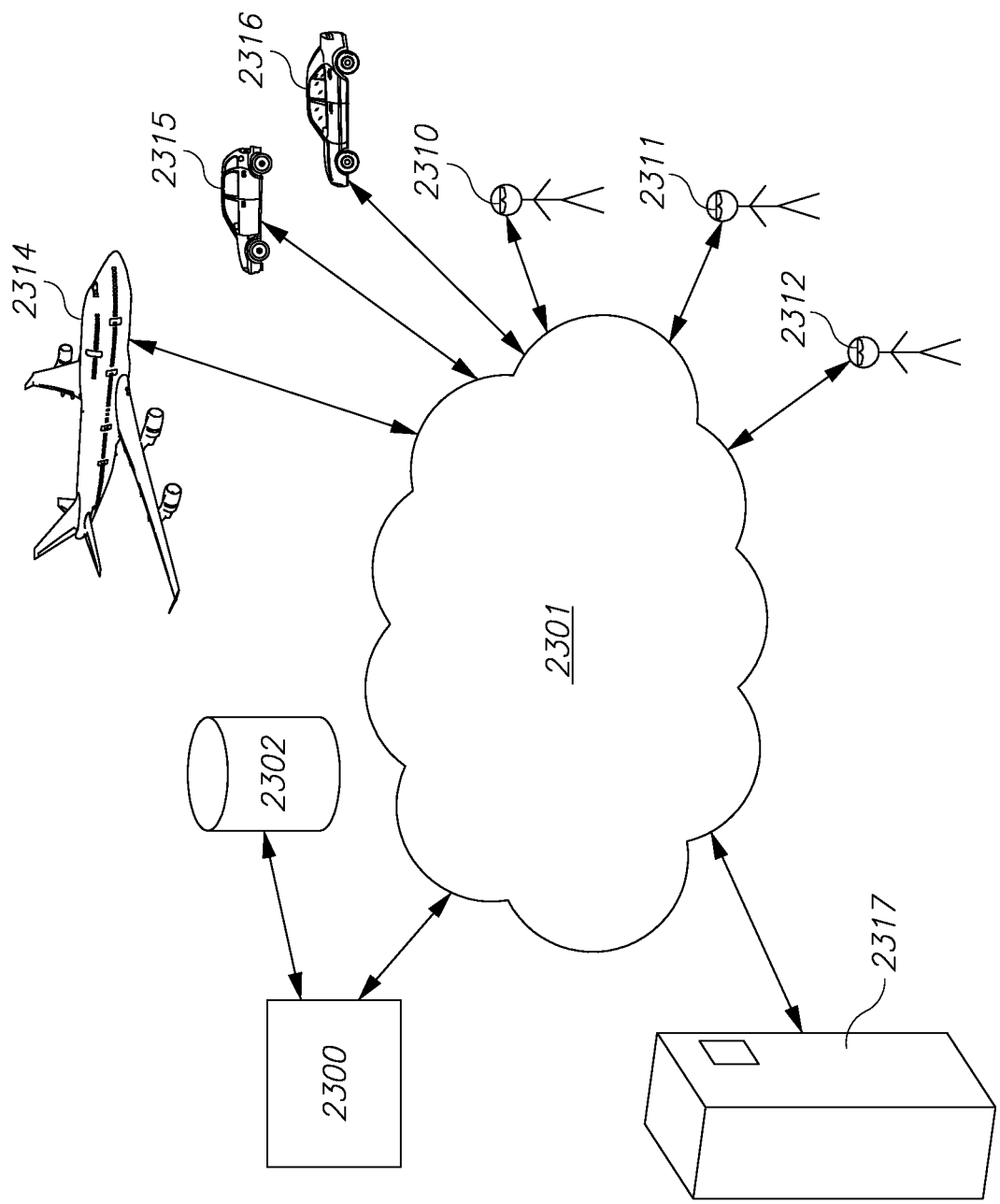
FIG. 23 is a schematic diagram of a communication system including a server according to some embodiments of the invention.

FIG. 23 is a schematic diagram of a communication system including servers according to some embodiments of the invention. FIG. 23 shows users carrying respective user equipment in the form of HMDs 2310, 2311, 2312 communicating with an anchor server 2300 via a communication network 2301. The communication network may include wired and wireless communications and all or part of a communication path between user equipment and server 2300 may be via the internet for example Anchor server 2300 has an associated anchors database 2303.

Figure 24:
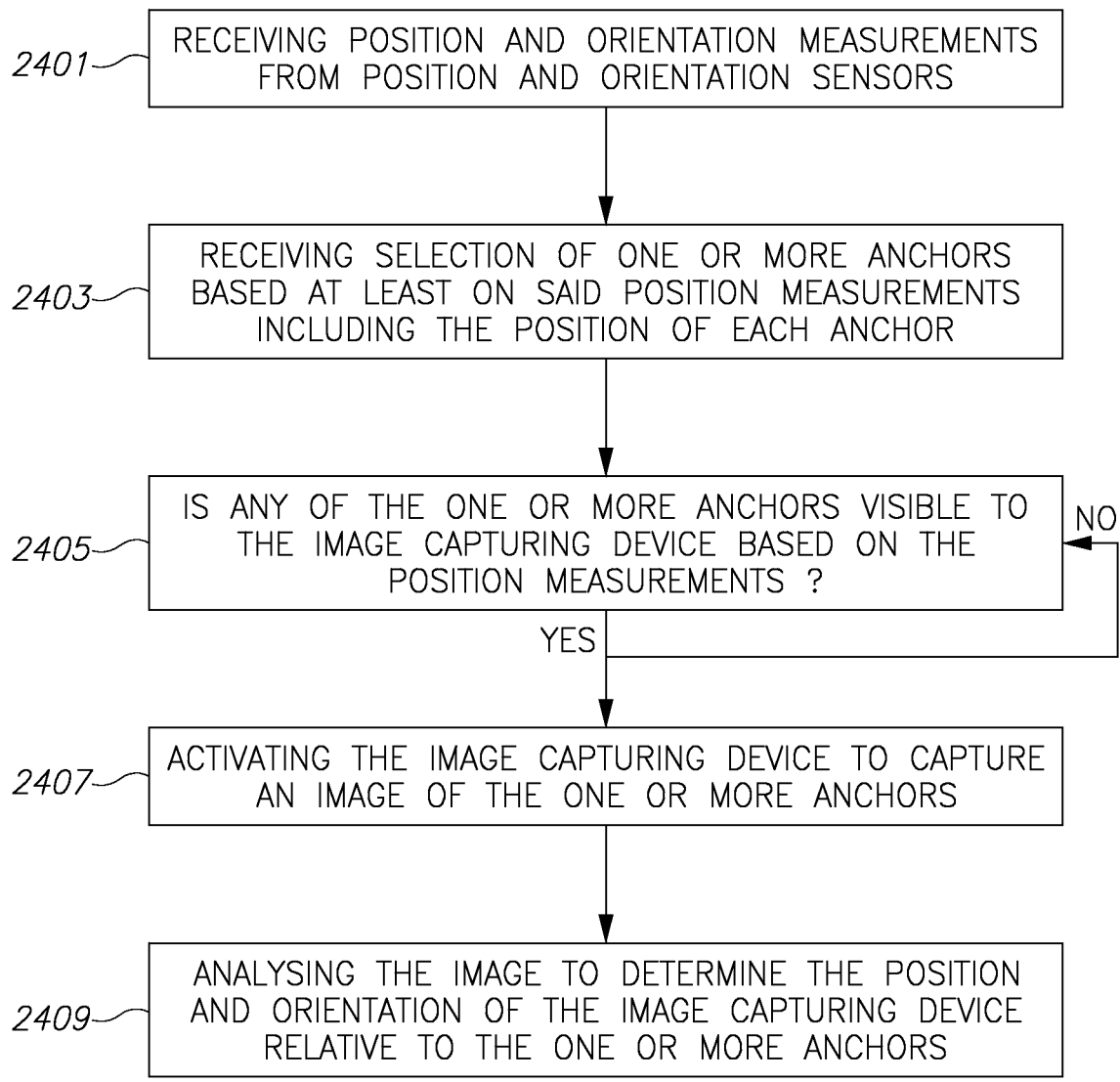
FIG. 24 is a flow chart of operations in methods according to some embodiments of the invention.

Methods according to some embodiments of the invention may be performed wholly or partially in user equipment such as HMD 2310, wholly or partially in a server such as server 2300 or distributed across multiple devices and components. A method carried out at user equipment is shown in FIG. 24. The method of FIG. 24 may be implemented in a controller of a HMD such as controller 330 of FIG. 3. Controller 330 may comprise a processor configured to perform the operations of FIG. 3 and thus some embodiments of the invention may be implemented as a computer readable medium.

The system of FIG. 23 is shown also to include an aircraft 2314, and vehicles 2315 and 2316, each of which may be provided with communication equipment for reporting their position and/or orientation to the anchors server 2300 in a manner described further herein. The system of FIG. 23 is also shown to include building 2317 which may have associated communication equipment, either at the building or remotely, for reporting to an anchors database details of an anchor on the building 2317.

The method of FIG. 24 commences with operation 2401, receiving position and orientation measurements from position and orientation sensors. This may be for example the controller 330 receiving position and orientation measurements from GPS unit 315 and IMU 320. Measurements received at operation 2401 may also include LOS measurements from eye tracking sensor 322. These various measurements may be received at the same time or at different times. The next operation 2403 in the flowchart of FIG. 24 is receiving a selection of one or more anchors from a database based on said position measurements, including the position of each anchor. The selection of one or more anchors may be received from a database storing data relating to a plurality of anchors including position and visibility of a plurality of anchors. The database may be stored at the HMD for example in memory 323 and the selection may be received at the controller 330, for example by the controller retrieving the one or more anchors from the memory 323. According to some embodiments of the invention, the selection of one or more anchors may be received in response to a request sent from the HMD, e.g. HMD 2310, from a controller 330 via a data communication unit 325, to anchors server 2300 server via network 2301. The anchors server 2300 may retrieve the one or more anchors from anchors database 2302. Thus a method according to some embodiments of the invention may include sending a request to a server for a selection of anchors at and receiving a selection in response to the request. The request sent to the server may include a position measurement and the selection may be based on the visibility of anchors from the position, or from a predicted position determined either at the user equipment or remotely, e.g. at the server.

As described herein, the database, either in memory 323 or anchors database 2302, may store data including the visibility of each anchor. The visibility may be determined by reference to an area or volume as described herein and may also depend on other factors or parameters relating to any of the user, the user equipment such as but not limited to the image capturing device, the time of day, ambient conditions such as prevailing weather and others. These other factors may be stored at the database with details of the anchors such as their position and other identification. The visibility of an anchor may be determined in real time, or "on the fly", for example with no perceptible delay to the user. Alternatively the visibility of at least some anchors may be predetermined and updated so that determination of visibility in response to a request is not necessary.

According to some embodiments of the invention, the activation of an image capturing device occurs when the position and orientation measurements indicate that at least one of said selected one or more anchors is visible to, or in the FOV of, the image capturing device. Thus, the next operation 2405 may comprise determining whether any of the received one or more anchors is visible to the image capturing device based on the position measurements, and optionally also orientation and/or LOS measurements if received. For example the decision at operation 2405 may comprise analyzing the measurements received at operation 2401 to determine whether the image capturing device has LOS to an anchor at its current orientation and if so the image capturing device may be activated, for example by the data communication unit 325 sending a signal to controller 330 and controller 330 sending a signal to image capturing device 305 to activate the image capturing device 305. If no, decision 2405 may be repeated. It should be noted here that an anchor need not be wholly within the FOV of the image capturing device 305 in order to satisfy the requirement of decision 2405. An anchor may be just appearing in the FOV as the user moves, so that by the time the image capturing device 305 has been activated more of the anchor is within the FOV. If the result of decision 2405 is positive (yes) the flow continues to operation 2407, activating the image capturing device 305 to capture an image of the selected one or more anchors. The flow then continues to operation 2409, analyzing the image to determine the position and orientation of the image capturing device relative to the selected one or more anchors. The analysis may take place in the controller 330. According to some embodiments of the invention the analysis may take place wholly or partially in a server such as server 2300, for example to save on processing power at the HMD.

Image based localization is known in the art. A few examples of how this is achieved will now be described. In one approach, given a captured image, preferably with (possibly inaccurate) position and orientation of a capturing camera, and a reference image taken by a reference camera with known (exact) position and orientation, one aims to find enough corresponding key points in the two images. From these correspondences, and the possibly the initial guess for the capturing camera's pose, the relative geometry between the capturing camera and the reference camera may be calculated, e.g. relative orientation, and relative position. If more independent reference images are available, any scale ambiguity using only one reference image can potentially be removed. The key points matching may be performed by extracting "interesting" locations on each image, e.g. corners, or blob centers, calculating a descriptor for each location, and looking for point pairs with similar descriptors. According to some embodiments of the invention, one or more descriptors appropriate to each anchor may be received, for example from anchor server 2300, with each selected anchor.

Another approach to the image based localization problem is based on a generative model, e.g. a 3D model with texture. The problem is rendered as a minimization problem over pose parameters. From the model, given a current guess for the pose, an image may be rendered and compared with a captured image. The objective is to find the pose parameters that minimize the dissimilarity between the captured image and the rendered image.

The localization problem can also be posed as a content based image retrieval problem. Given a large database of images, each with known pose, a feature vector may be assigned to each image. A feature vector is then calculated for the captured image and compared with the feature vectors of the database images. The pose of the captured image is taken to be the pose of the database image with best matching feature vector. The features in the vector can either be crafted or learnt in a machine learning training process.

An end-to-end classification approach is also possible involving subdividing the surface of the earth into thousands of multi-scale geographic cells, and training a deep network using millions of geotagged images. Each geographic cell may be scored directly from the pixels of a captured image to determine the position of the capturing device. This approach does not produce orientation.

Another end-to-end approach poses the localization problem as a regression problem. Here a Bayesian convolutional neural network returns full (and continuous) location and orientation, directly from the pixels of a given captured image.

The analysis at operation 2409 may be carried out in any manner, for example as described herein with reference to any of FIGS. 14A, 14B, 15A, 15B, 16A. 16B, 17A, 17B, 18A, 18B or in any other manner The analysis may be performed at the user equipment, for example using an algorithm operated by a processor in data communication unit 325. Alternatively, it may be performed remotely, for example in a server such as anchors server 2300 or a separate server performing the analysis. If the anchor is to be used for AR as discussed herein, it is desirable for this analysis to be performed as quickly as possible in order to reduce latency between the measurements of position and/or orientation and the display of AR information.

According to some embodiments of the invention, the operations of FIG. 24 may be performed in any order. In some particular embodiments, operation 2405 may be omitted and images may be captured, for example at regular intervals, without first checking whether a visible anchor is likely to be present in the image. Then one or more images may be selected for location of a user according to any of the criteria discussed herein. In other words, the criteria are used to determine which anchor or anchors in an image which has already been captured should be used to determine the position of a user, rather than when to capture an image. Such embodiments may be suitable when power for image capturing is not limited. The determination as to which anchor(s) to use for location of the user may be made prior to any analysis of the image itself and may save on image processing power and time.

Thus, according to some embodiments of the invention one or more anchors may be selected as described herein and used for determination of relative position, rather than for example all of the anchors in the radius of the image capturing device. This may avoid searching in the image for an anchor that was not visible or it may ensure that only the most suitable of the visible anchors are used for determination of relative position and/or orientation.

Figure 25:
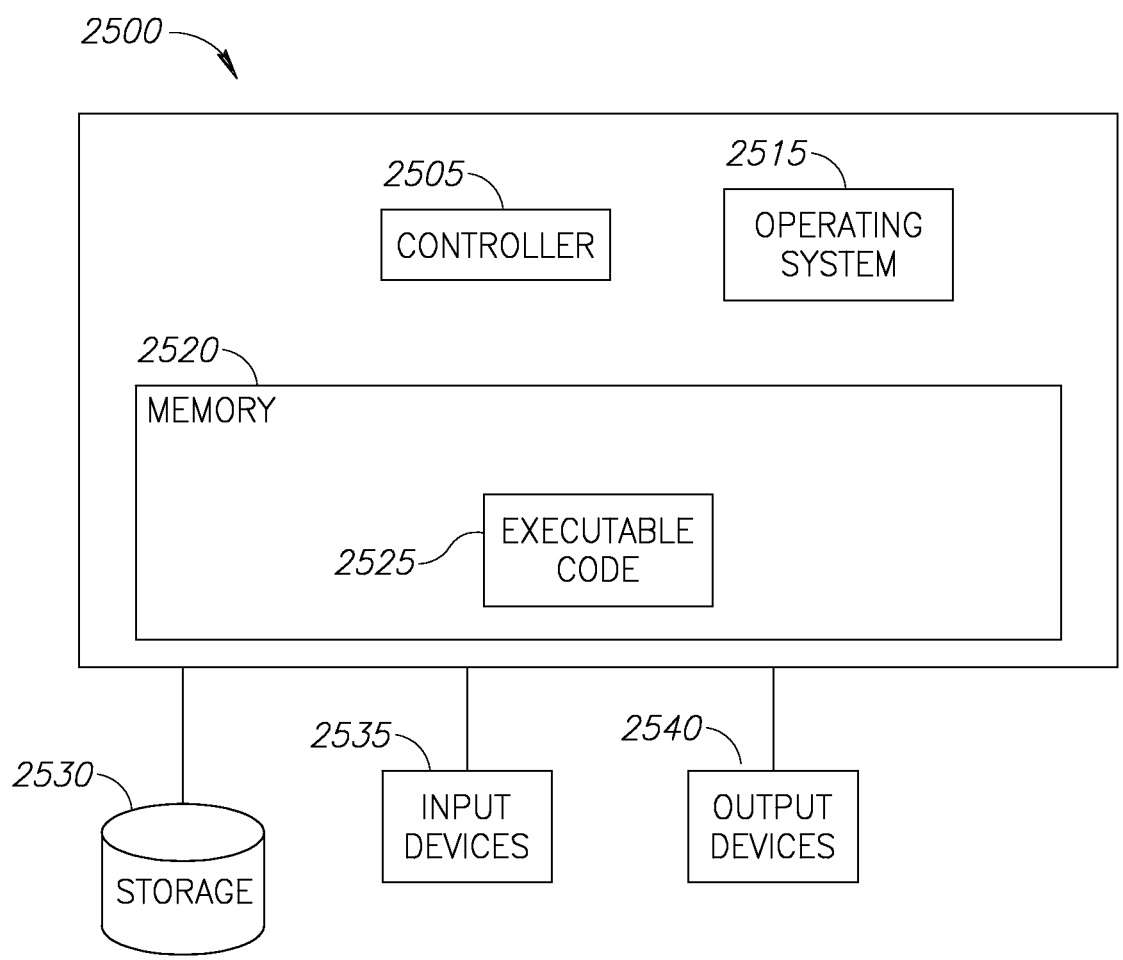
FIG. 25 is a block diagram of a computing system according to some embodiments of the invention.

The functions of the HMD of FIG. 3 or the server 2300 of FIG. 23 may be implemented in any known computing system, one example of which is described for completeness with reference to FIG. 25.

Computing device 2500 may include a controller 2505 that may be, for example, a central processing unit processor (CPU), a chip or any suitable computing or computational device. Thus controller 2505 may perform the function of controller 330 or a controller within server 2300. Computing system 2500 may further comprise an operating system 2515, a memory 2520, storage 2530, an input devices 2535 and an output devices 12540. The controller 2505 or CPU may perform the function of any of the processors mentioned herein.

Operating system 2515 may be or may include any code segment designed and/or configured to perform tasks involving coordination, scheduling, arbitration, supervising, controlling or otherwise managing operation of computing device 2500, for example, scheduling execution of programs. Operating system 2515 may be a commercial operating system.

Memory 2520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 2520 may be or may include a plurality of, possibly different memory units.

Executable code 2525 may be any executable code, e.g., an application such as the server or client applications described above, a program, a process, task or script. Executable code 2525 may be executed by controller 2505 possibly under control of operating system 2515. Where applicable, executable code 2525 may carry out operations described herein in real-time. In some embodiments, more than one computing device 2500 may be used. For example, a plurality of computing devices that include components similar to those included in computing device 2500 may be connected to a network and used as a system.

Storage 2530 may be or may include, for example, a hard disk drive, a floppy disk drive, a Compact Disk (CD) drive, a CD-Recordable (CD-R) drive, a universal serial bus (USB) device or other suitable removable and/or fixed storage unit. Thus for example either memory 323 in a HMD or database 2302 may be in the form of storage 2530.

Input devices 2535 may include devices or components which provide input to controller 2505 including but not limited to user input devices. In the case of controller 330, input devices may include image capturing device 305, GPS unit 315, IMU 320, eye tracking sensor 322 or any other input device. In the case of a controller at server 2300, input devices may include a mouse, keyboard, touch input device or any other input device. A HMD according to embodiments of the invention may include a touch input device or other user interface. Output devices 2540 may include a display such as an optical display being part of optical display system 310, speakers, and any other suitable output devices.

According to some embodiments of the invention, an anchor need not be stationary and may be moving. A moving anchor for which the position and orientation is accurately known at an instant in time may be used to determine location in the same way as other anchors described herein. For example, a moving or movable anchor may be all or part of a vehicle on land, sea or air, such as a car, drone, ship or aircraft. A moving anchor may comprise or be part of an autonomous vehicle, which is expected to be more common in future.

Figure 26:
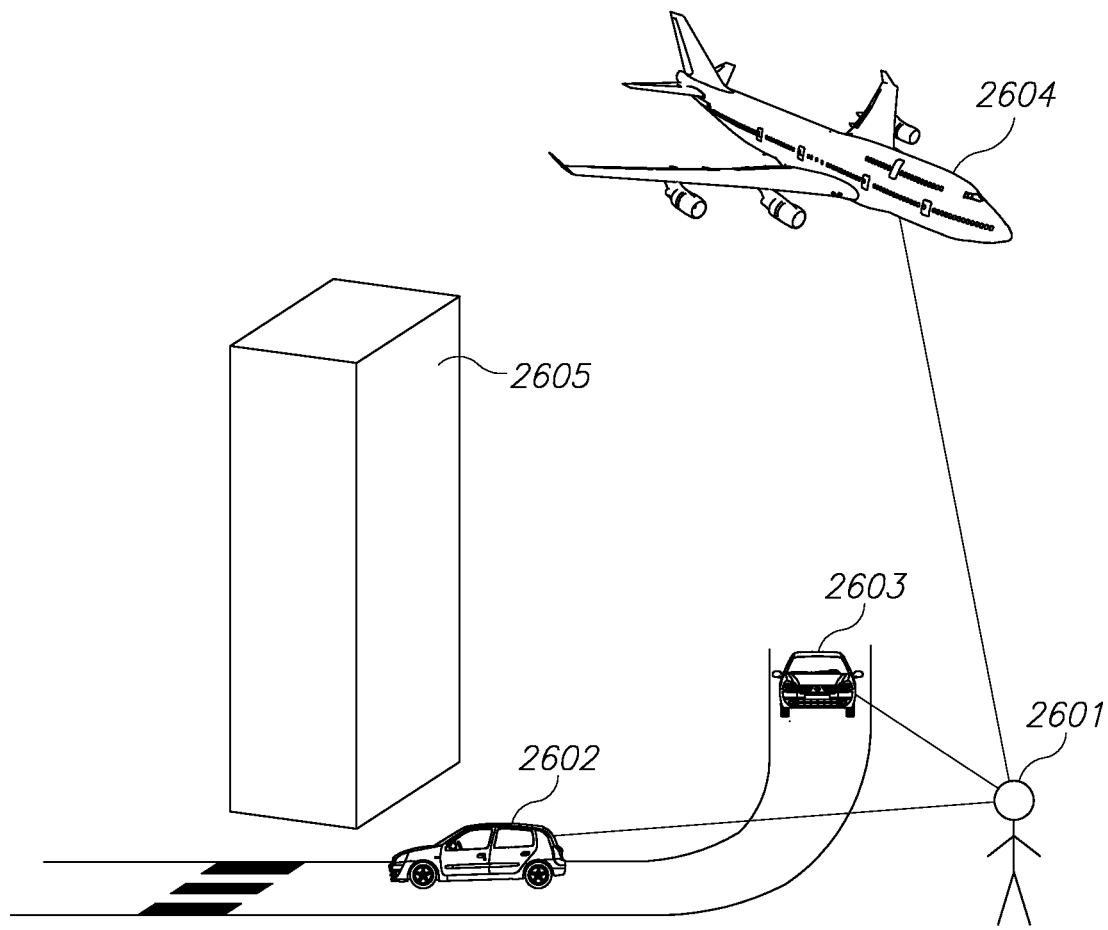
FIG. 26 illustrates schematically the determination of position using a moving anchor.

FIG. 26 illustrates schematically the determination of position using a moving anchor. In this illustration two cars 2602, 2603, an aircraft 2604 in addition to a building 2605 are in the LOS of a user. All or part of any of the cars, the aircraft or the building may serve as an anchor for use in accurately determining the position of the user, or an image capturing device in a HMD of a user, in the same way as described elsewhere herein. With moving anchors, the visibility will be time dependent and therefore they may only be available for position determination for limited time periods. The selection of one or more anchors according to some embodiments of the invention may be based on a predicted position in the case of a moving anchor. A moving anchor may report its position at intervals, for example to an anchors server 2300. A future predicted position of an anchor, for example at a time when position determination of a user is required, may be determined by one or more processors located at the anchor or by one or more processors in the anchors server.

It will be appreciated that this prediction of position may be additional to prediction of the position of a user, or the HMD of a user, according to some embodiments of the invention.

Some embodiments of the invention relate to the generation of a database, such as database 2302 shown in FIG. 23, containing details of anchors that may be used for determining position. An anchors database may be updated and/or accessed via a server such as anchors server 2300. A database according to some embodiments of the invention may be updated with information on moving anchors. Thus, for example referring to FIG. 23, any of the aircraft 2314 and vehicles 2315 and 2316 may report their position and/or orientation to the anchors server 2300 at intervals so that they are available to be selected and the selection transmitted to user equipment such as a HMD, to be used in any of the methods described herein. For example, the selection of an anchor may depend on one or more parameters of an image capturing device. In other words, the selection of an anchor to locate an image capturing device may depend on parameters of the anchor as well as the image capturing device.

A database according to some embodiments of the invention may be designed for moving capturing devices, for example a database may contain data relating to the suitability of an anchor, moving or stationary, to be used to locate a particular capturing device.

Some embodiments of the invention may provide systems and methods for augmenting one or more existing databases containing details of anchors. Such augmentation could for example be based on data fed back from user equipment to an anchors server. Such data might for example include a measure of the or effectiveness of the anchor in accurately determining the location of the image capturing device. The effectiveness is discussed elsewhere herein and may be determined in any way known in the art, for example using statistical analysis of an image correlation method to determine a confidence value. This may be determined automatically by one or more processors in user equipment. Alternatively, data fed back from user equipment may be image data from an image capturing device from which position may be determined, whereby the location and the effectiveness of the anchor may be determined remotely from the user equipment.

The selection of one or more anchors may take into account time-independent parameters of a user such as user characteristics, e.g. age, height, gender. Equipment carried by a user one meter tall, e.g. a child, might access the same database as equipment carried by a user two meters tall, e.g. an adult. However different anchor(s) may be selected for each.

Additionally, or alternatively the selection of one or more anchors may take into account time dependent parameters of a user, e.g. real-time parameters such as speed of movement, or a less precise indication such as whether the user is walking or running. The real-time parameters of the user may be matched to the real time parameters of an anchor, such as a moving anchor, according to the real time parameters of each.

A measure of the effectiveness of an anchor may take account of one or more other parameters, such as user parameters or user equipment parameters as described herein, including but not limited to user height and image capturing device range or resolution or field of view. For example, a confidence measure of a position measurement may be different depending on whether the user is an adult or a child or on other user parameters. Thus, according to some embodiments of the invention any number of different measures of effectiveness of anchors may be determined corresponding to different parameters.

Parameters of anchors that may be included in an anchors database may include size, visibility for example as described herein, wavelength of radiation emitted, modulation parameters and so on.

A database according to some embodiments of the invention may include data relating to individual user equipment, such as head vibration history, which may be pertinent to the choice of anchor for that user. Thus, a different anchor might be chosen for a user prone to nerve tremors from an anchor chosen for a user with a stable head.

It will be appreciated that any of the anchors described herein may also be used for the display of information to a user. For example, if the anchor is a window in a building, some AR information may be displayed to a user via a HMD overlaying the window from the view point of the HMD user. This opens up the possibility for the creation anchors for use not only in locating a user but also for the display of AR information. This might be done by owners of buildings or other potential anchors. For example, data relating to building 2317 shown in FIG. 23, or a feature of the building such as a corner, may be communicated to an anchors database such as database 2302, for example via anchors server 2300. This may be selected for use in determining the position of an image capturing device. The database may evolve so that the anchor is use more or less depending on its effectiveness, for example in the manner of machine learning.

A database according to embodiments of the invention may become "smart" after a duration of time in which some HMDs/users versus anchors will have a success/failure rate.

According to some embodiments of the invention, anchors may be grouped, or clustered, for example in a database, according to "success" statistics, to different types of users, user equipment, movement pattern, time domain (day/night) and other parameters.

According to some embodiments of the invention, an anchor used for position determination may be used automatically for the display of AR information. For example, the use of an anchor by user equipment may be detected and AR information may be displayed in connection with the anchor. This may be regardless of the effectiveness of the anchor in determining the location of an image capturing device. For example, every device viewing a particular anchor may be shown AR on that anchor even without accurate position and orientation determination.

New anchors of the kind described with reference to FIGS. 17 and 18 may be created and reported to an anchors database according to some embodiments of the invention.

An anchor may be associated with an "anchor to data" kit, for example in the form of software, whereby AR information is automatically presented when an anchor is viewed by an image capturing device.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element unless otherwise stated.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method of position and orientation determination using an image capturing device comprised in user equipment comprising a position sensor and an orientation sensor, the method comprising:

receiving position measurements from said position sensor;

receiving a selection of one or more anchors based on said position measurements including the position of each anchor;

receiving orientation measurements from said orientation sensor;

determining whether any of said one or more anchors is visible to said image capturing device based on said position and orientation measurements;

activating said image capturing device to capture an image including said one or more anchors when any of said one or more anchors is visible to said image capturing device; and analyzing the image to determine the position of the image capturing device relative to the one or more anchors.

2. The method of claim 1 comprising receiving for each of said one or more anchors data relating to the visibility of the anchor, wherein said determining whether any of said one or more anchors is visible is based on said data.

3. The method of claim 2 wherein said data comprises an area associated with each anchor from which an image capturing device may have an uninterrupted line of sight "LOS" to the anchor.

4. The method of claim 2 wherein said data comprises a volume associated with each anchor from which an image capturing device may have an uninterrupted LOS to the anchor.

5. The method of claim 2 wherein said data is time dependent and wherein said determining whether any of said one or more anchors is visible is based on the current time.

6. The method of claim 2 wherein:

said data determines a relationship between time and an area or volume from which an image capturing device may have an uninterrupted LOS to the anchor; and said determining whether any of said one or more anchors is visible comprises:

determining the current time to determine a current area or volume from which an image capturing device may have an uninterrupted LOS to the anchor and using said current area or volume to determine whether any of the one or more anchors is visible at the current time.

7. The method of claim 5 wherein the time dependency is based on behavior of people at different times of day in a geographical region including an anchor.

8. The method of claim 2 wherein said data is dependent on ambient conditions, further comprising receiving the ambient conditions, wherein said determining whether any of said one or more anchors is visible is based on the ambient conditions.

9. The method of claim 1 comprising predicting a future position from said position measurements, wherein said selection is based on said predicted position.

10. The method of claim 1 wherein said determining whether any of said one or more anchors is visible is based on one or more parameters of the image capturing device.

11. The method of claim 1 comprising receiving one or more characteristics relating to the user wherein said determining whether any of said one or more anchors is visible is based on said one or more characteristics.

12. The method of claim 1, wherein at least one of said one or more anchors comprises a source of radiation.

13. The method of claim 10 wherein the radiation source is modulated in a predetermined manner so that an image of the anchor contains additional information as to the orientation of the image capturing device as compared to an image of an unmodulated source.

14. The method of claim 10 comprising receiving for each source of radiation one or more features comprising any one or more of emission spectrum, intensity, modulation, location, illumination angle; wherein said analyzing is based on said one or more features.

15. The method of claim 1 comprising receiving historical information relating to the effectiveness of an anchor when viewed from various positions, wherein the selection of an anchor is based on said historical information.

16. The method of claim 1 comprising receiving notification of an area in which no anchor is visible wherein no determination as to whether an anchor is visible is made in said area.

17. The method of claim 1 wherein for at least some anchors the database includes a measure of the effectiveness of the anchor in determining a relative position and orientation of the image capturing device to the one or more selected anchors.

18. The method of claim 17 comprising updating the effectiveness measure of the one or more anchors in the database based on said analysis.

19. A method of position and orientation determination using an image capturing device comprised in user equipment comprising also position and orientation sensors, the method comprising:
 receiving measurements of position and orientation from said position and orientation sensors;
 capturing one or more images including a set of anchors using said image capturing device;
 selecting one or more anchors of said set of anchors based on said position measurements from a database relating to a plurality of anchors including said set of anchors, wherein said database includes the position and visibility of each anchor and the selection is based on the visibility; and
 analyzing the image to determine the relative position and orientation of the user equipment to one or more selected anchors; and using the relative position and orientation to refine said received measurements of position and orientation.

20. A head mounted device "HMD" comprising an image capturing device, at least one position sensor, at least one orientation sensor and a controller, wherein the controller is configured to:
 receive position measurements from said at least one position sensor;
 receive a selection of one or more anchors based on said position measurements including the position of each anchor;
 receive orientation measurements from said at least one orientation sensor;
 determine whether any of said one or more anchors is visible to said image capturing device based on said position and orientation measurements;
 activate said image capturing device to capture an image including said one or more anchors when any of said one or more anchors is visible to said image capturing device; and
 analyze the image to determine the position and orientation of the image capturing device relative to the one or more anchors.

* * * * *